United States Patent [19]

Saeman et al.

[11] 4,146,676

[45] Mar. 27, 1979

[54] GRANULAR CALCIUM HYPOCHLORITE COATED WITH A LOW MELTING INORGANIC SALT BY SPRAY GRAINING

[75] Inventors: Walter C. Saeman, Hamden, Conn.; Noel N. Coe, West Lake, La.

[73] Assignee: Olin Corporation, New Haven, Conn.

[21] Appl. No.: 756,930

[22] Filed: Jan. 5, 1977

Related U.S. Application Data

[60] Division of Ser. No. 557,715, Mar. 12, 1975, Pat. No. 4,048,351, which is a continuation-in-part of Ser. No. 521,417, Nov. 6, 1974, which is a continuation-in-part of Ser. No. 276,615, Jul. 31, 1972, abandoned.

[51] Int. Cl.² .................. C01B 11/06; C11D 3/395; D06L 3/08
[52] U.S. Cl. .................. 428/403; 428/407; 252/99; 252/95; 252/187 H
[58] Field of Search .................. 252/99, 95, 187 H; 427/213; 428/403, 407

[56] References Cited

U.S. PATENT DOCUMENTS

| 3,036,013 | 5/1962 | Jaszka | 252/99 |
| 3,382,093 | 5/1968 | Nack | 427/213 |
| 3,622,366 | 11/1971 | Piester | 252/95 X |
| 3,793,216 | 2/1974 | Dychdala | 252/187 H |
| 3,953,354 | 4/1976 | Faust | 252/187 H |
| 3,967,039 | 6/1976 | Ninane et al. | 427/213 X |
| 3,969,546 | 7/1976 | Saeman | 427/213 |

Primary Examiner—Sam Silverberg
Attorney, Agent, or Firm—Donald F. Clements; James B. Haglind

[57] ABSTRACT

A process is described in which granular calcium hypochlorite particles are encapsulated with at least one layer of a hydrated low melting inorganic salt. In this process granular calcium hypochlorite particles are lifted from a moving bed to the upper part of a distribution zone and the lifted particles are released to fall downwardly through the upper portion to the moving bed. A molten hydrated low melting inorganic salt is sprayed onto the falling particles above the moving bed, and the coated particles are cooled to provide at least one solid outer layer of said low melting hydrated inorganic salt.

20 Claims, 5 Drawing Figures

GRANULAR CALCIUM HYPOCHLORITE COATED WITH A LOW MELTING INORGANIC SALT BY SPRAY GRAINING

CROSS REFERENCE TO RELATED APPLICATIONS

This is a division of application Ser. No. 557,715, filed Mar. 12, 1975 now U.S. Pat. No. 4,048,351, which is a continuation-in-part application of co-pending application Ser. No. 521,417, filed Nov. 6, 1974, which is a continuation-in-part application of Ser. No. 276,615, filed July 31, 1972, and is now abandoned.

FIELD OF THE INVENTION

This invention relates to granular calcium hypochlorite particles which resist dusting and degradation during handling, and which are highly stable when contacted with lighted cigarettes or organic materials.

DESCRIPTION OF THE PRIOR ART

In most methods for the commercial manufacture of calcium hypochlorite, a slurry is obtained containing crystals of calcium hypochlorite dihydrate in a cool aqueous solution of calcium hypochlorite and sodium chloride or other inorganic halide. The slurry is filtered to produce a cake containing from about 42 to about 48 percent by weight of water. When this cake is dried, a very light, porous cake is obtained which breaks down to an undesirable fine, dusty powder. The crystals in the cake lack a natural cohesive tendency. If the filter cake is compressed, the resulting cake is harder but fragments into flaky granules with fragile edges. These are easily abraded and form an unsatisfactory, dusty product. Thus, the wet cake has been partially dried, compressed into a sheet between heavy rolls which is broken up and further dried as in U.S. Pat. No. 2,195,754, which issued April, 1940, to H. L. Robson et al. This product has a highly irregular shape with fragile edges and will break down into a fine dust when crushed or submitted to severe handling conditions.

U.S. Pat. No. 2,195,756, which issued Apr. 2, 1940, to Maurice C. Taylor, describes a process for preparing calcium hypochlorite particles by admixing the wet cake of calcium hypochlorite in a cutting type mixer with dry fines in sufficient proportion to decrease the water content from the 42 to 48 percent level down to about the 20 to 30 percent level. No water is evaporated during this mixing step, but instead the moist particles are dried in a separate step under carefully controlled conditions to avoid any substantial crushing of the material. Granule compression pressures are less in the mixer than by rolls and Taylor's granules are therefore softer. Although granular material is produced by this technique, the integrity of the granular particles is not strong enough to resist dusting when subjected to severe handling conditions.

Similar granulation techniques are described in U.S. Pat. Nos. 2,195,755 and 2,195,757, which issued to Homer L. Robson et al on Apr. 2, 1940. In each of these granulation techniques, care must be taken to dry the granulated material under conditions which avoid substantial crushing or abrasion. The problem with the products of these techniques is that excessive dusting occurs when the product is dried under severely agitated conditions.

In each of the four above-described calcium hypochlorite granulation techniques, drying is carried out under gentle handling conditions in a rotary vacuum dryer or the Wyssmont type tray dryer, which is commonly used to minimize dust formation and entrainment in the drying atmosphere. Drying rates in these types of driers are relatively slow. Because of the sensitivity of calcium hypochlorite to thermal degradation, the losses of active hypochlorite are relatively high in these types of dryers.

In the process of U.S. Pat. No. 2,347,402, which issued on Apr. 25, 1944, to George Gerald Day, a plastic and unsprayable slurry of calcium hypochlorite is subjected simultaneously to evaporation and agitation until the water content is from about 25 to 35 percent and the solids form loosely bonded aggregates. The drying of the above-described product preferably takes place while the product is maintained in a relative quiescent condition, i.e, with little or no agitation until the moisture content is reduced to about 2 percent or less.

U.S. Pat. No. 2,901,435, which issued to H. L. Robson on Aug. 25, 1959, discloses spray-drying of calcium hypochlorite slurries to avoid filtration and drying problems and to minimize loss of hypochlorite by reduction of the drying time. However, the product is hollow, highly porous particles of low density which cannot withstand severe handling conditions without severe dusting.

The spray graining technique has been used to prepare granular solids from various aqueous solutions and aqueous slurries. For example, British Pat. No. 576,557 relates to the dehydration of aluminum sulfate by spraying a solution thereof onto a rotating bed of preformed crystals at a temperature from about 80° C. to about 95° C. (176°–203° F.) while passing hot gases in contact with the solid to remove water. Due to its high viscosity and tendency to form hydrated salts, aluminum sulfate solutions cannot readily be concentrated beyond a 50 percent to 60 percent by weight of $Al_2(SO_4)_3$. It is not subject to thermal degradation hence relatively high temperatures and long rentention time can be used to volatilize water from the granular solid. In addition, U.S. Pat. No. 2,926,079, which issued to B. G. Smith on Feb. 23, 1960, relates to the production of fertilizer pellets by spraying a slurry of fertilizer solids onto a shower of individualized fertilizer particles in a stream of hot gases in a flighted granulator. Fertilizer solids are usually clay-like in texture with good cohesive properties. Therefore, they can be easily bonded into granules in a moist condition. Bonding moisture is also easily removed at elevated temperatures over suitable periods of time because fertilizer salts still have good thermal stability at temperatures which induce rapid volatilization of water. Screening, crushing and recycling of the solid particles are disclosed by Smith.

Canadian Pat. No. 592,240, which issued Feb. 9, 1960, discloses spraying ammonium sulfate solutions onto a shower of crystals in a rotary grainer. Rigid crystalline materials of this type are readily formed into granular particles of high integrity in such a process. Ammonium sulfate is a fertilizer salt of sufficient thermal stability to permit water volatilization at high temperatures over long periods of time.

In contrast to the foregoing cases, calcium hypochlorite is subject to rapid chemical decomposition in the presence of moisture at temperatures only slightly in excess of ambient room temperatures. The experimentally measured decomposition rate at 30° C. for a slurry of calcium hypochlorite in water was 1 percent loss of available chlorine per hour. For every 10° C. elevation in slurry temperature, the decomposition rate doubles approximately and reaches about 4 percent per hour at 50° C. At 90° C. — a temperature still below the boiling point of water — the decomposition rate exceeds 50 percent per hour. Thermal stability of calcium hypochlorite improves as the water content is reduced. Thus, anhydrous calcium hypochlorite has good stability even at temperatures near 100° C. Stability improvement becomes more rapid as water is reduced below about 17 percent at which point residual moisture exists mainly as the water of hydration of the dihydrate of calcium hypochlorite. In view of this interrelation of hypochlorite stability with moisture and temperature, water removal must be rapid and at a low temperature to minimize the degradation of the product during the granulation and drying steps of the process. Also, since crystals in hypochlorite slurry are very weak in cohesive tendency, as supported by earlier patent art cited above, this rapid, low-temperature drying must also be done under circumstances where sufficient cohesive bonding is induced in the granule to form smooth, rounded hard grains not easily subject to breakage or abrasion during the normal handling of the product in commerce.

There is a need at the present time for improved calcium hypochlorite granules which have a high level of integrity and resist dusting when subjected to severe handling conditions.

It is a primary object of this invention to provide improved granular calcium hypochlorite particles which have a high level of integrity and resist dusting when subjected to crushing under severe handling conditions.

Another object of this invention is to provide an improved method for producing a novel granular calcium hypochlorite material having a high level of integrity which resists crushing when subjected to severe handling conditions.

It is another object of this invention to provide an improved method for recovering calcium hypochlorite from aqueous slurries thereof to produce a particulate product of controlled size, available chlorine content and moisture content.

A further object of this invention is to provide a method for producing calcium hypochlorite from aqueous slurries thereof at relatively low reaction and drying temperatures to produce a particulate product with reduced losses of available chlorine caused by decomposition.

It is another object of this invention to provide a process for accelerating the volatilization of water from moist and hydrated calcium hypochlorite at relatively low temperatures to reduce the quantity of calcium hypochlorite present in process equipment and thus minimize potential manufacturing hazards which could result from accidental ignition and decomposition of this material.

Another object of the invention is to provide a method for producing smooth-surfaced, rounded granular calcium hypochlorite particles free of sharp, fragile edges which are subject to abrasion and dust formation during handling.

It is another object of this invention to provide novel granular calcium hypochlorite particles having an inner portion of calcium hypochlorite coated with an outer portion of a low melting inorganic salt.

These and other objects of the invention will be apparent from the following detailed description of the invention.

SUMMARY OF THE INVENTION

The novel composition of this invention is a coated granular calcium hypochlorite comprised of a core of calcium hypochlorite encapsulated with at least one outer rounded layer of a low melting inorganic salt, wherein the core of each particle generally has a diameter which ranges from about 200 to about 2,000 microns and the novel coated granules have a diameter ranging from about 400 to about 5,000 microns. The novel coated granules of this invention are formed from a pumpable and sprayable low melting inorganic salt in molten form in a process which comprises:

(a) maintaining a moving bed of solid calcium hypochlorite particles containing from about 0.5 to about 10 percent by weight of water, and from about 50 to about 85 percent by weight of available chlorine on a dry basis in the lower part of a distributing zone having an upper part and a lower part, (b) lifting a portion of the moving bed of particles to the upper part of the distributing zone and releasing the lifted particles to fall downwardly through the upper portion of the distributing zone to said moving bed in the lower portion thereof, (c) spraying onto said falling particles a pumpable and sprayable melt of a low melting inorganic salt other than calcium hypochlorite, (d) maintaining a temperature in said distributing zone sufficiently low to solidify the melt on the surface of the calcium hypochlorite particles and form at least one solid coating layer of the low melting inorganic salt on the particles, and (e) removing at least a portion of the resulting coated solid calcium hypochlorite particles from the distributing zone.

Lack of cohesiveness between crystals of calcium hypochlorite is counteracted in the structure and growth of the novel granular hypochlorite of this invention in that freshly deposited, pliable moist layers of solid inorganic salt are packed and pounded onto the dried hardened underlaying seed substrate by innumerable impacts as the grains cascade in the drum or are otherwise forced into violent collision with one another. Where crystalline particles are too large to submit to hardening by collision impact, these may retain individual identity as nuclei to seed the bed or they may be collected in a dry dust collector, pulverized and returned in more finely divided form, more susceptible to cohesion and hardening by collision impact.

The coated particles removed from the coating distributing zone can be further cooled or dried to reduce the water content to a lower level. Alternatively, the coated particles removed from the distributing zone can be conveyed to a subsequent distributing zone where they are sprayed with at least one other melt and/or a surface conditioning agent. In a preferred embodiment, the calcium hypochlorite core particles are first coated with an aqueous slurry or solution of an alkaline inorganic salt, dried to the desired water level and then coated with at least one layer of a low melting inorganic salt.

Further sizing of the portion of coated calcium hypochlorite particles separated from the coating distributing zone is generally not necessary, but may be effected, if desired.

The novel rounded granular coated calcium hypochlorite particles prepared in accordance with the process of this invention, particularly when utilizing core particles of calcium hypochlorite prepared by one of the spray graining techniques described below, have a high level of integrity and resist dusting and degradation when subjected to severe handling conditions. For example, irregularly shaped granules of commercial hypochlorite break easily along the thin fragile edges when subjected to pressure and abrasion. The fragmented edges form fine dust easily dispersed in ambient atmosphere and results in severe respiratory irritation, discomfort and health hazards. Fragile edges are absent on the novel rounded grain of this invention and hence dusting cannot occur. Even if this novel grain fractures under pressure, fragments remain sufficiently large to escape entrainment in ambient air during normal handling of the product. As a result, even though the novel calcium hypochlorite particles of this invention may be fractured under severe handling conditions during shipment, nevertheless, a minimum of finely divided particles are formed. Also, as a result, a more uniform distribution of the calcium hypochlorite in the water being treated can be obtained and respiratory irritation and discomfort from entrained hypochlorite dust in air is greatly minimized. In addition, when the particles have a coating of an inorganic salt as the exterior layer, there is an increased degree of resistance to ignition by lighted cigarettes or the reaction caused when contacted with organic materials, as well as improved chemical stability.

DESCRIPTION OF THE PREFERRED EMBODIMENTS

Figure 1:
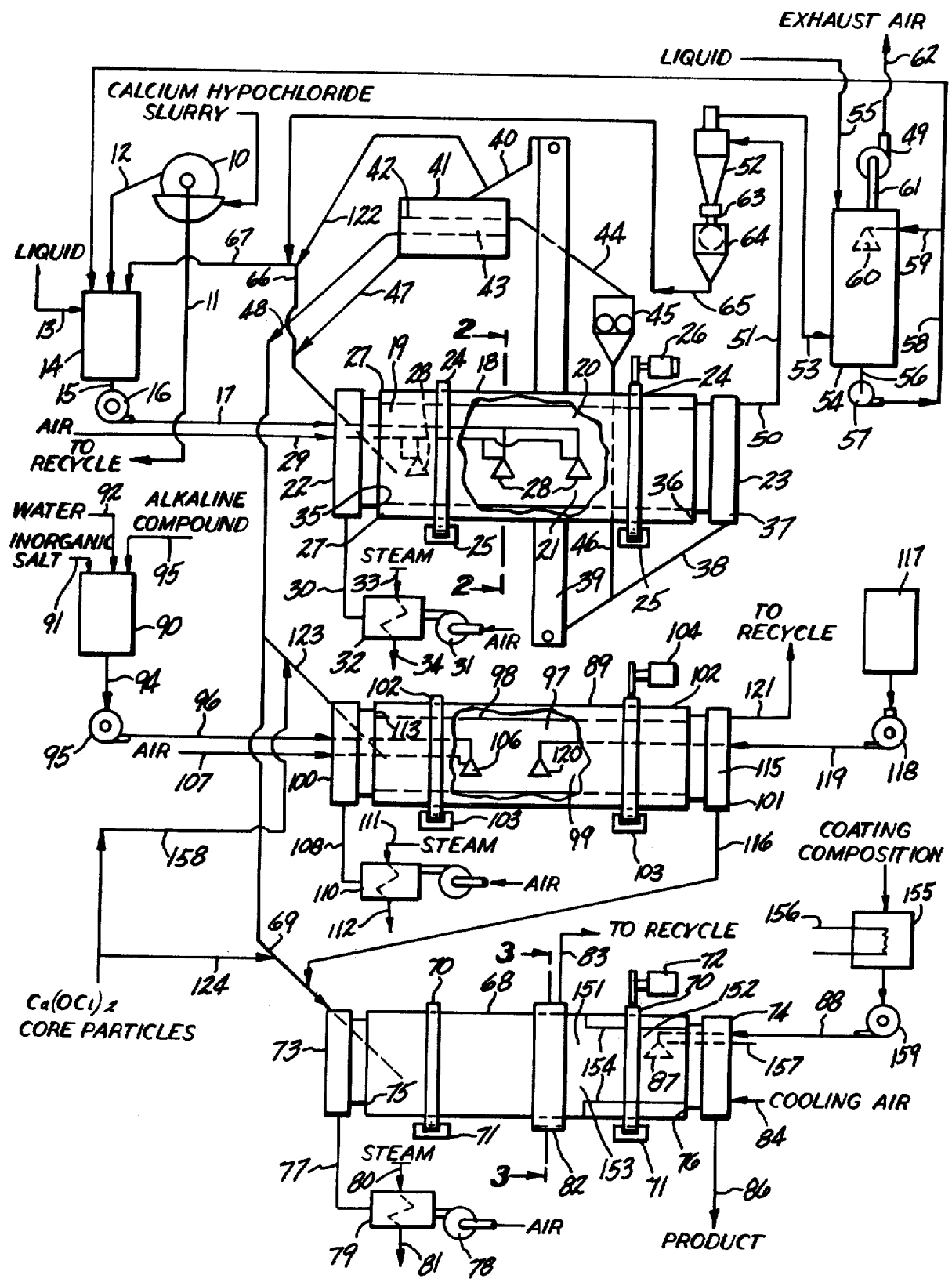
FIG. 1 shows two embodiments of the invention which utilizes one or two rotary spray grainers and a combined rotary dryer-grainer. In one embodiment, core particles of calcium hypochlorite are prepared in the first spray grainer and the product fraction is conveyed to a combined rotary dryer-grainer where the particles are dried and then coated with a low melting inorganic salt. In a second embodiment, the product fraction from the first spray grainer is conveyed to a second spray grainer for coating with an alkaline inorganic salt other than calcium hypochlorite The coated particles are then conveyed to the rotary dryer-grainer for further drying and coating with a low melting inorganic salt.

More in detail, as shown in FIG. 1, a calcium hypochlorite process slurry of the type formed in a commercial calcium hypochlorite process is conveyed to filter 10. Calcium hypochlorite slurry is separated into filtrate 11, which is recycled or otherwise processed, and filter cake 12, which is admixed with a liquid such as water fed through liquid line 13 into slurry mixer 14 to produce a pumpable and sprayable slurry of calcium hypochlorite. This slurry is conveyed from slurry mixer 14 through mixer discharge line 15 by means of slurry pump 16 through slurry feed line 17 to spray grainer 18.

Spray grainer 18 has a distributing zone 19 with an upper portion 20 and a lower portion 21, a feed end 22 and an opposite discharge end 23. Spray grainer 18 is provided with exterior tires 24 secured to the exterior thereof which are adapted to rotate in trunnions 25, exterior tires 24 being driven by a suitable motor driven rotation means 26 to effect rotation of spray grainer 18 within the desired speed range.

Figure 2:
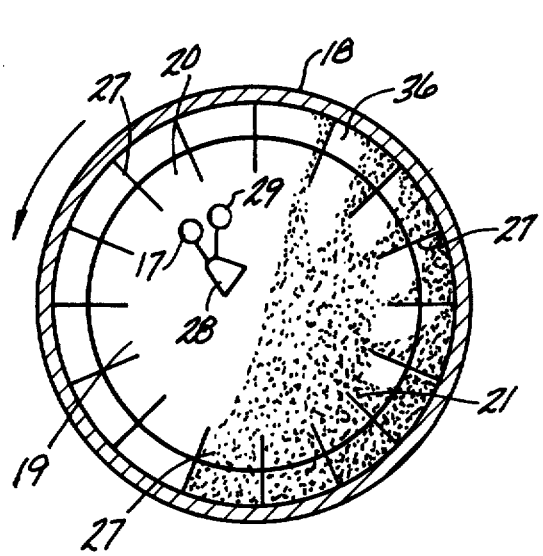
FIG. 2 is a cross-sectional view of the first spray grainer of FIG. 1 through lines 2—2.

As shown in FIG. 2, a bed of solid calcium hypochlorite particles is placed in lower portion 21 of distributing zone 19 to form, when spray grainer 18 is rotated, a moving bed of particulate solids which gradually progresses from feed end 22 to discharge end 23 of spray grainer 18. Transport of the feed from the feed end to the discharge end can be solely by interaction with a co-current flow of drying gases (as described below) or by a combination of gas induced transport aided or retarded by positive or negative slope of the drum axis. Bed transport can also be aided or detained by use of inclined vanes and dam rings attached to the interior of the drum wall.

As described further in FIG. 2, a series of lifters 27 are positioned around the interior circumference of spray grainer 18 to lift the particles of calcium hypochlorite from the moving bed in lower portion 21 to the upper portion 20 of distributing zone 19. As spray grainer 18 rotates, the particles gradually fall from lifters 27 as they approach the top of upper portion 20 and fall through distributing zone 19 to lower portion 21 into the moving bed of solid calcium hypochlorite particles. While the solid particles are falling from lifters 27 from upper portion 20 to lower portion 21 of distributing zone 19, slurry pump 16 is continuously conveying through slurry feed line 17 the pumpable and sprayable calcium hypochlorite slurry to a plurality of spray nozzles 28. Compressed air is conveyed through compressed air feed line 29 to nozzles 28 in order to disperse the slurry as fine droplets from the spray nozzles and to effect the spraying of these fine droplets of slurry into the falling particles of calcium hypochlorite.

Heated air or other inert gas contacts the calcium hypochlorite particles wetted with the slurry to simultaneously evaporate and remove water and to deposit a thin solid layer of the calcium hypochlorite-containing component of the slurry on the surface of the wetted particles. The coated particles fall to the moving bed and continue to be lifted, dropped and coated until they are discharged from spray grainer 18. Any convenient heating technique may be employed. For example, heated air is preferably conveyed through heated air line 30 concurrently with the flow of the moving bed of solids. Air is conveyed by blower 31 to heat exchanger 32 which is heated by steam conveyed through steam feed line 33 to heat exchanger 32. The heated air produced in heat exchanger 32 is conveyed through heated air line 30 by blower 31 into feed end 22 through spray grainer 18, and passed out discharge end 23. The heated air fed to spray grainer 18 is generally at a temperature in the range from about 85° C. to about 250° C. to effect simultaneous evaporation and removal of water from the falling particles. The steam condensate from heat exchanger 32 is discharged through steam discharge line 34.

At feed end 22 a feed retaining flange 35 is secured to the exterior wall of spray grainer 18 in order to retain the moving bed of particles within spray grainer 18. Similarly, at discharge end 23, a discharge retaining flange 36 is secured to the interior wall of spray grainer 18 in order to retain most of the moving bed of particles within spray grainer 18. Feed retaining flange 35 and discharge retaining flange 36 each have an opening in the center, preferably of circular shape. The diameter of the opening in discharge retaining flange 36 is preferably greater than the diameter of the opening of feed retaining flange 35 in order to insure that particles are discharged from spray grainer 18 at discharge end 23 rather than at feed end 22. For co-current air flow, bed transport is primarily by interaction of the cascading bed with the air stream. Positive or negative axial slope can be used to aid or retard air transport. Also, internal dam rings (not shown) can be used to retard flow by increasing bed depth. Also, slanted vanes (not shown) can be mounted to inner walls of spray grainer 18 to aid or retard bed transport.

As the number and size of calcium hypochlorite granules increases, the moving bed builds up behind discharge retaining flange 36 until a level is reached where the particles fall out through the opening in discharge retaining flange 36 into solids collection zone 37. Granules from solids collection zone 37 are conveyed by suitable conveying means to a suitable size classification apparatus. For example, a solids conveying means such as a chute 38, elevator 39 and inclined trough 40 convey all or part of the solids to screens 41 which are preferably heated to minimize blinding. However, other apparatus such as an air classifier may be used to separate the particles into an over-size fraction, an under-size fraction and a product fraction. By-pass line 122 returns solids in excess of the feed rate to spray grainer 18. Screens 41 contain an over-size screen 42 and an under-size screen 43 which separate over-size particles and under-size particles from the product fraction. Generally, any desired particle size can be obtained. In a typical separation, the over-size screen 42 has a mesh size in the range from about 4 to about 24 mesh and the under-size screen 43 has a mesh size in the range from about 16 to about 70 mesh. Under-size screen 43 always has a mesh opening smaller than over-size screen 42. A typical product fraction ranges from about −8 to +30 mesh, but the size range can be varied as desired. Over-sized particles retained by over-size screen 42 are conveyed through over-size particle conduit 44 to roll crusher 45 where the over-size particles are crushed to pass through over-size screen 42 and then conveyed through crushed over-size particle conduit 46 to chute 38 where the crushed particles are recycled through elevator 39 to screens 41. Under-size particles which pass through under-size screen 43 are conveyed by means of under-size particle conduit 47 to the feed end of spray grainer 18, where they serve as core particles or nuclei for the formation of additional granules of calcium hypochlorite. A product fraction of rounded granular calcium hypochlorite is collected in product conduit 48 and processed as described more fully below.

Exhaust fan 49 is used to withdraw moist air having finely divided particles of calcium hypochlorite suspended therein from solids collection zone 37 through a series of conduits and apparatus. The solid-laden moist air is withdrawn from solids collection zone 37 through conduit 50 to dust collector feed line 51 and into dry collector 52, preferably of the cyclone type. Air exhausted from the top of dry dust collector 52 is conveyed through air discharge line 53 to wet scrubber 54 for more effectual cleaning. Liquid such as water or a dilute calcium hypochlorite solution which may be produced as a by-product in the preparation of the calcium hypochlorite filter cake, is fed through liquid feed line 55 to the top of wet scrubber 54 where it contacts the moist air and removes the bulk of fine solid particles retained in the air. The resulting dust laden slurry is removed from the bottom of scrubber 54 through slurry discharge line 56 by means of scrubber pump 57. A portion of slurry discharged from scrubber pump 57 is conveyed to calcium hypochlorite slurry mixer 14 through slurry recycle line 58. The remainder of the slurry from slurry recycle line 58 is recycled to the top of scrubber 54 through slurry feed line 59 and then sprayed through scrubber nozzle 60 onto the rising dust laden air fed into the bottom of wet scrubber 54. Contact between the slurry and air removes substantially all of the suspended solids from the air. The resulting gases depleted of dust are conveyed through exhaust conduit 61 and exhaust fan 49, and discharged through air exhaust line 62 into the atmosphere, or are otherwise treated.

Dry dust collector 52 also separates dry particles of calcium hypochlorite from the moist air fed in through dust collector feed line 51. These dry particles are generally too coarse to form hard cohesive granules, particularly if recycled to spray grainer 18. Cohesion of the particles is improved by intensive pulverization. Thus, the dust particles are discharged from dry dust collector 52 through solids discharge line 63 into pulverizor 64. The solid particles are comminuted to a diameter of generally less than about 40 microns and then conveyed through pulverized particle line 65 to solids recycle line 66 which recycles the pulverized solids to spray grainer 18. If desired, a portion or all of the pulverized solids may be recycled to slurry mixer 14 through mixer recycle line 67.

The product fraction of rounded granular calcium hypochlorite particles which do not pass through undersize screen 43 are conveyed through product conduit 48 to combined rotary dryer-grainer 68, hereinafter referred to as "rotary dryer 68", by means of dryer feed conduit 69. Generally, the moisture content of the product fraction of screens 41 ranges from about 5 to about 30 percent, and preferably from about 15 to about 27 percent by weight. If desired, particles of calcium hypochlorite prepared by conventional commercial operations or otherwise, having a particle size diameter in the range from about −24 to about +70 mesh, an available chlorine content in the range from about 50 to about 85 percent by weight on a dry basis, and a water content in the range from about 0.5 to about 30, and preferably from about 0.5 to about 10 percent by weight may be fed through core particle feed line 124 to dryer feed conduit 69 to rotary dryer 68. In addition, the product fraction from screen 43 may be dried in a suitable dryer such as a rotary dryer to the desired moisture content and the resulting dry product may be fed to rotary dryer 68 through core particle feed line 124.

Rotary dryer 68 is provided with at least two dryer tires 70, preferably constructed of metal, positioned at two mechanically-suitable locations near the extremity of rotary dryer 68. Dryer tires 70 rotate in dryer tire trunnions 71 and rotary dryer 68 is rotated by a suitable dryer motor drive means 72 which acts upon one of the dryer tires 70 to effect rotation of rotary dryer 68.

Rotary dryer 68 is provided with a dryer feed end 73 and a dryer discharge end 74. Dryer feed end 73 is provided with a retaining flange 75 and dryer discharge end 74 is provided with a discharge retaining flange 76 in order to maintain a moving bed of solids in rotary dryer 68. Retaining flange 75 and discharge retaining flange 76 are each provided with a circular opening in the center to permit entrance and exit of particles being dried. Heated air is fed into feed end 73 of rotary dryer 68 through heated air conduit 77. The heated air is provided by blowing atmospheric air through dryer blower 78 into heat exchanger 79 which is heated by exchange with steam fed to steam inlet 80. The heated air is conveyed to heated air conduit 77. The steam condensate is discharged from heat exchanger 79 through condensate discharge line 81.

Figure 3:
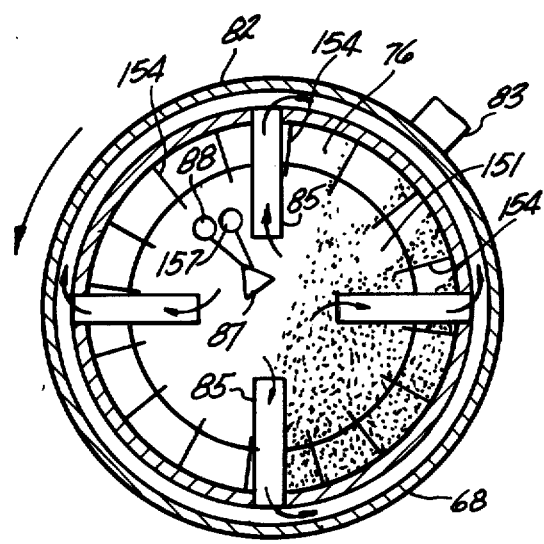
FIG. 3 is a cross-sectional view of the rotary dryer-grainer through the lines 3—3 of FIG. 1.

FIG. 3 is a cross-sectional view of rotary dryer 68 through 3—3 of FIG. 1. As indicated in FIGS. 1 and 3, rotary dryer 68 is provided with an air exhaust bustle 82 which communicates by means of gas discharge conduit 83 with a dust collection system (not shown) of the same type as dust collector 52, exhaust fan 49, and scrubber 54 employed with spray grainer 18. The hot gases which have increased in moisture content within rotary dryer 68 as well as cool air which is drawn into discharge end 74 of rotary dryer 68 through cool air feed line 84 are withdrawn through tubes 85 located around the periphery of the internal wall of rotary dryer 68. Tubes 85 communicate with a chamber located in bustle 82. Gas discharge conduit 83 positioned in bustle 82 conveys the mixture of gas and any finely divided calcium hypochlorite that may be present in the chamber within bustle 82 to recycle in a separate dust recovery system of the type described above. FIG. 3 also shows retention of the moving bed of solids in dryer 68 by means of discharge flange 76. Granular coated calcium hypochlorite particles which have been dried in dryer 68 pass over discharge retaining flange 76 into product collection line 86 where they are conveyed to storage or other processing.

If the moisture content of the calcium hypochlorite particles fed through core particle feed line 124 is within an acceptable range, for example, from about 0.5 to about 10 percent by weight, heated air for drying need not be supplied to rotary dryer 68 through heated air conduit 77. The dust collection systems, however, is still employed.

Rotary dryer 68 is provided with a distributing zone 151 having an upper portion 152 and a lower portion 153 in the cooling portion of the drum, preferably in the portion between gas discharge conduit 83 and discharge flange 76. A coating composition of a low melting inorganic salt is applied to the dried calcium hypochlorite particles in the distributing zone.

Rotary dryer 68 is provided with internal flights 154 in distributing zone 151 similar to lifters 27 of spray grainer 18 in order to maintain a moving bed of calcium hypochlorite particles in lower portion 153. As rotary dryer 68 rotates, a substantial portion of the particles to be coated are lifted to upper portion 152 of rotary dryer 68. As rotation progresses, and the lifted particles approach the top of upper portion 152, the lifted particles are released to fall downwardly through upper portion 152 to the moving bed in lower portion 153. The coating composition is applied as the particles are falling. As a result, there is an increase in the degree of contact between the particles, the coating composition and the cooling air. Little or no dusting occurs. If desired, internal flights 154 may be included in the drying section of rotary dryer 68 to improve contact between the solids and the drying air.

Low melting inorganic salt is fed to melt tank 155 provided with melt heater 156, which provides heat to maintain the salt in molten form. The resulting melt is conveyed by melt pump 159 through spray feed line 88 to spray nozzle 87 positioned in distribution zone 151. Compressed air is conveyed through melt compressed air feed line 157 to spray nozzle 87 in order to disperse the melt as fine droplets from spray nozzle 87 to effect spraying of these fine droplets of melt onto the falling particles of calcium hypochlorite.

If desired, two or more melt spray systems may be used in distribution zone 151 with different hydrates of the same low melting salt or different salts being sprayed from separate spray nozzles 87. In this embodiment, adjustment of spray nozzles 87 permits contact between the different melts prior to and during contact with the falling particles of calcium hypochlorite.

Cool air or other inert gas is fed into discharge end 74 through cooling gas feed line 84. The temperature of the cooling gases is sufficiently low to cause solidification of the melt on the surface of the particles to improve flowability, prevent caking and form exterior layers of low melting inorganic salt which will protect the encapsulated calcium hypochlorite from ignition when contacted with lighted cigarettes, organic liquids and the like. When the calcium hypochlorite granules are coated in this manner, gas discharge conduit 83 conveys the hot gases containing suspended solids from air exhaust bustle 82 to a separate dry or wet dust collection system (not shown) where solid particles are separated and recycled to the bed or melt tank 155 and fed through spray feed line 88 to rotary dryer 68. This technique prevents recycle of the coating composition to the beginning of the process and prevents contamination of the calcium hypochlorite cores with the particles of coating composition.

Bed transport towards the discharge end 74 may be induced by interaction of cascading solids with the co-current flow of drying gases in the drying section of the drum. Rotary dryer 68 may also be set at a postive slope from dryer feed end 73 towards dryer discharge end 74 to aid bed transport to the discharge end. The particles of calcium hypochlorite are thereby moved at a controlled rate from the feed end 73 towards the discharge end 74 as rotary dryer 68 is rotated. Bed depth in discharge end 74 of rotary dryer 68 can be limited by selection of a suitable diameter for retaining flange 76 in discharge end 74.

Although drying and coating of the calcium hypochlorite particles are preferably accomplished in a single unit as rotary dryer 68, these two steps can be effected in two separate units (not shown) utilizing a rotary dryer or other dryer means to reduce the water content of calcium hypochlorite particles to the desired level and a rotary spray grainer to coat the dried particles with a molten inorganic salt. The several steps, graining, coating, drying, and further applications of spray or melt coatings can also be executed sequentially in a single drum in either a batchwise or continuous operating procedure. The spray grainer is provided with at least one spray nozzle, a plurality of radial lifters, a cooling atmosphere, preferably counter-current to the direction of feed, and means for supplying a molten inorganic salt, as described above for the graining end of rotary dryer 68. If the calcium hypochlorite particles to be coated are dry enough, the dryer unit is by-passed and they may be fed directly to the rotary graining unit for coating with the molten inorganic salt.

In a preferred embodiment of the invention, the product fraction from screen 43 is conveyed through product conduit 48 to second spray grainer feed line 123 to a second spray grainer 89 where the calcium hypochlorite particles of the product fraction are coated with a buffer coat of an alkaline inorganic salt prior to coating with a low melting inorganic salt in rotary dryer 68. If desired, calcium hypochlorite particles prepared by conventional commercial operations or otherwise, as described above, for feed to rotary dryer 68 may also be fed to second spray grainer 89 through core particle feed line 158.

A buffer coating of alkaline inorganic salt in an aqueous medium such as a solution or slurry form is prepared in spray feed tank 90 by addition of the inorganic salt through inorganic salt feed line 91 and water through water feed line 92. If desired, an alkaline compound may be added to spray feed tank 90 by means of alkaline feed line 93 to adjust the pH of the coating composition to the desired level. The components of the coating composition are admixed in spray feed tank 90 to form a pumpable and sprayable solution or slurry of the inorganic salt. This slurry is conveyed from spray feed tank 90 through feed tank discharge line 94 by means of coating pump 95 through coating feed line 96 to second spray grainer 89, which operates in a manner similar to spray grainer 18. In spray grainer 89, calcium hypochlorite core particles are coated with an inorganic salt coating in the same manner as calcium hypochlorite core particles are coated with layers of calcium hypochlorite in spray grainer 18.

Second spray grainer 89 has a coating distributing zone 97 with an upper portion 98 and a lower portion 99, a feed end 100 and an opposite discharge end 101. Spray grainer 89 is provided with exterior tires 102 secured to the exterior thereof which are adapted to rotate in trunnions 103, exterior tires 102 being driven by a suitable motor driven rotation means 104 to effect rotation of second spray grainer 89 within the desired speed range. A cross sectional area of second spray grainer 89 corresponds to that of spray grainer 18 of FIG. 2. In the operation of the second spray grainer 89, a bed of solid calcium hypochlorite particles to be coated is placed in lower portion 99 of coating distributing zone 97 to form, when spray grainer 89 is rotated, a moving bed of particulate solids which gradually progresses from feed end 100 to discharge end 101 of second spray grainer 89. Transport of the feed from the feed end to the discharge end can be solely by interaction with a co-current flow of drying gases (as described below) or by a combination of gas induced transport aided or retarded by positive or negative slope of the axis of second spray grainer 89. Bed transport can also be aided or detained by use of inclined vanes and dam rings attached to the interior of the drum wall.

As described further in FIG. 1, a series of lifters 105 are positioned around the interior circumference of second spray grainer 89 to lift the particles of calcium hypochlorite from the moving bed in lower portion 99 to upper portion 98 of coating distributing zone 97. As second spray grainer 89 rotates, the particles gradually fall from lifters 105 as they approach the top of upper portion 98 and fall through coating distributing zone 97 to lower portion 99 into the moving bed of solid calcium hypochlorite particles. While the solid calcium hypochlorite particles are falling from lifters 105 in upper portion 98 to lower portion 99, coating pump 95 is continuously conveying through coating feed line 96 the pumpable and sprayable coating composition to at least one coating spray nozzle 106. Compressed air is conveyed through compressed air feed line 107 to nozzle 106 in order to disperse the coating composition as fine droplets from the coating spray nozzle 106 and to effect the spraying of these fine droplets of coating composition onto the falling particles of calcium hypochlorite.

Heated air or other inert gas contacts the calcium hypochlorite particles wetted with the solution or slurry of alkaline inorganic salt to simultaneously evaporate and remove water, and to deposit a thin layer of the solid coating composition on the surface of the calcium hypochlorite particles. The coated particles fall to the moving bed, and continue to be lifted, dropped and coated until they are discharged from second spray grainer 89. As the solids progress through the distribution zone, layer upon layer of the alkaline inorganic salt forms on the calcium hypochlorite particles and encapsulate the calcium hypochlorite particles with at least one layer of the coating composition to improve the chemical and thermal stability of these particles. Any convenient heating technique may be employed. For example, heated air is preferably conveyed through heated air line 108 concurrently with the flow of the moving bed of solids. Air is conveyed by blower 109 to heat exchanger 110 which is heated by steam conveyed through steam feed line 111 to heat exchanger 110. The heated air produced in heat exchanger 110 is conveyed through heated air line 108 by blower 109 into feed end 100 through second spray grainer 89, and passed out discharge end 101. The heated air fed to second spray grainer 89 is generally at a temperature in the range from about 85° C. to about 250° C. to effect simultaneous evaporation and removal of water from the falling particles. The steam condensation from heat exchanger 110 is discharged through steam discharge line 112.

At feed end 100 a feed retaining flange 113 is secured to the exterior wall of second spray grainer 89 in order to retain the moving bed of particles. Similarly, at discharge end 101, a discharge retaining flange 114 is secured to the interior wall of second spray grainer 89 in order to retain most of the moving bed of particles. Feed retaining flange 113 and discharge retaining flange 114 each have an opening in the center, preferably of circular shape. The diameter of the opening in discharge retaining flange 114 is preferably greater than the diameter of the opening of feed retaining flange 113 in order to insure that particles are discharged from second spray grainer 89 at discharge end 101 rather than at feed end 100. As in spray grainer 18, co-current air flow bed transport is primarily by interaction of the cascading bed with the heated air stream provided by heated air line 108. Positive or negative axial slope can be used to aid or retard air transport. Also, internal dam rings (not shown) can be used to retard flow by increasing bed depth. Also, slanted vanes (not shown) can be mounted to inner walls of second spray grainer 89 to aid or retard bed transport.

As the number and size of calcium hypochlorite granules coated with the alkaline inorganic salt increases, the moving bed builds up behind discharge retaining flange 114 until a level is reached where the particles fall out through the opening in discharge retaining flange 114 into coated solids collection zone 115. Coated calcium hypochlorite granules from solids collection zone 115 are conveyed to dryer feed conduit 69 or rotary dryer 68 by means of coated solids conveying means 116, or are otherwise processed. For example, size classification of the product of second spray grainer 89 can be effected, if desired, with recycle of the undersize and crushed oversize fractions, but generally this size separation is not necessary.

If desired, another alkaline inorganic salt in solution or slurry form may be applied over the coating composition provided through coating feed line 119. In this embodiment, the second coating composition is placed in second coating tank 117 and pumped by means of second coating pump 118 through second spray coating feed line 119 to at least one second coating spray nozzle 120. Compressed air (not shown) may be provided to disperse the second coating composition into fine droplets for better contact with the calcium hypochlorite particles.

A separate dust recovery system (not shown), employing an exhaust fan of the same type as exhaust fan 49 is used to withdraw moist air having finely divided particles of coated calcium hypochlorite suspended therein from solids collection zone 115 through conduit 121 to dust collector feed line of the same type as dust collector feed line 51 and into a dry collector of the same type as dry dust collector 52, and a wet scrubber like wet scrubber 54 in the same manner as moist air is withdrawn from spray grainer 18. Recovered solids are recycled as feed to second spray grainer 89.

The coated particles of second spray grainer 89 are rounded, granular calcium hypochlorite particles coated with at least one coating of an alkaline inorganic salt. Generally, the moisture content of the coated particles from second spray grainer 89 ranges from about 5 to about 30 percent, and preferably from about 15 to about 27 percent by weight. When the moisture content of the coated calcium hypochlorite ranges from about 0.5 percent to about 10 percent, it need not be dried in rotary dryer 68, but is only coated with the low melting inorganic salt in the coating portion of rotary dryer 68. If the moisture content is above about 10 percent by weight, the coated particles are conveyed through product conduit 116 through dryer feed conduit 69 to rotary dryer 68, as shown in FIG. 1.

Figure 4:
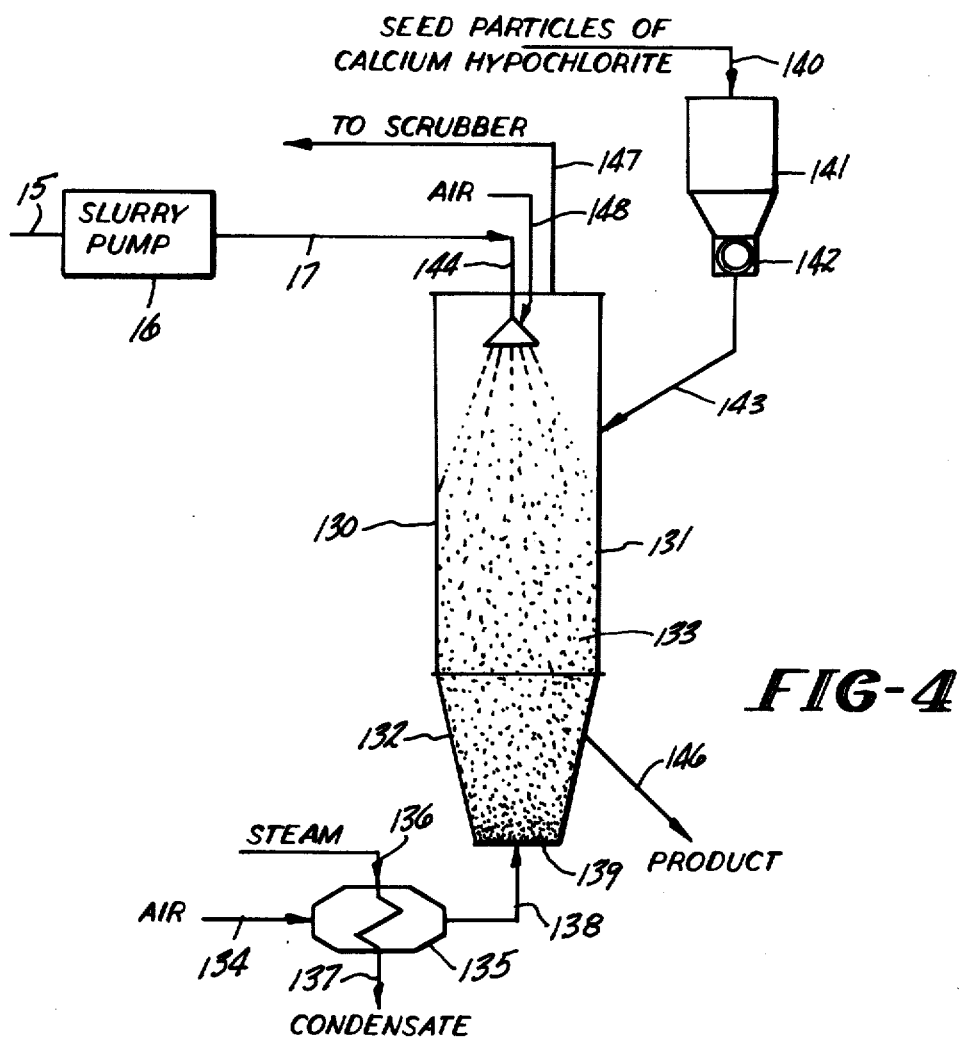
FIG. 4 shows a schematic diagram of an embodiment of the invention in which a fluidized bed is used as the distribution zone to prepare core particles of $Ca(OCl)_2$.

FIG. 4 shows an embodiment of this invention in which a fluidized bed technique is used as the distribution zone to prepare calcium hypochlorite core particles by the spray grain technique. Fluidized bed apparatus 130 is comprised of an upper tower 131 in the upper portion and a lower frusto-conical section 132 in the lower portion. A moving bed of solid particles of calcium hypochlorite 133 is suspended within fluidized bed apparatus 130 by means of a suitable gas such as air or nitrogen, which is fed by means of gas feed line 134 into heat exchanger 135 and heated with steam fed into steam inlet 136 and discharged through condensate line 137. Heated air or nitrogen from heat exchanger 135 is conveyed through heated gas line 138 into the bottom of frusto-conical section 132 into diffuser grid 139. Heated air or nitrogen is fed through the diffuser grid 139 under sufficient pressure and velocity to maintain the moving bed of solid calcium hypochlorite particles 133 suspended within fluidized bed apparatus 130. Solids in the moving bed have substantially the same composition at start-up as the moving bed employed in spray grainer 18 of FIGS. 1, 2 and 3. These feed particles of calcium hypochlorite generally have a particle size in the range from about 200 to 2,000 microns, and preferably from about 400 to about 1,000 microns in diameter. They may be obtained by crushing commerical granular calcium hypochlorite to the desired particle size, by utilizing a more finely divided product produced in conventional calcium hypochlorite processes, or by recycling fines from another or the same fluidized bed operation. These finely divided seed particles are conveyed through solids conveying means 140 to hopper 141 which is provided with rotary feed means 142 for controlling the rate of feed of the solid particles to the upper portion of upper tower 131 by means of controlled solid feed line 143.

Calcium hypochlorite slurry from calcium hypochlorite slurry mixer 14 (not shown) of FIG. 1 is conveyed through mixer discharge line 15 to slurry pump 16 which conveys the calcium hypochlorite through slurry feed line 17 to fluidized bed slurry feed line 144 and into at least one spray head 145 to the upper portion of upper tower 131. The calcium hypochlorite slurry is sprayed through spary head 145 on to the suspended particles in the moving bed of calcium hypochlorite 133 maintained in fluidized bed apparatus 130. As the calcium hypochlorite slurry coats the surfaces of seed particles of calcium hypochlorite, the heated air or nitrogen gas in the bed simultaneously removes and evaporates the water component of the slurry, leaving a thin layer of solid calcium hypochlorite on the seed particles of calcium hypochlorite initially fed into the suspended bed. Freshly deposited pliable solids are compacted and hardened with the hard dry seed particles by collision impacting of the grains against one another. This coating technique is continued as the particles contact additional spray of calcium hypochlorite slurry. Although the heated air or nitrogen gas is fed through heated gas line 138 at sufficient pressure and velocity to maintain substantially all of the solid particles in suspension, there is a tendency for the lighter particles to gravitate to the upper portion of the moving bed in upper tower 131 and for the heavier particles to gravitate to the frusto-conical section 132 in the lower part of fluidized bed apparatus 130. An appropriate discharge line 146 is positioned in lower frusto-conical section 132 to remove at least a portion of the suspended particles in the moving bed during the continuous operation of fluidized bed apparatus 130. This portion of the calcium hypochlorite particles removed through discharge line 146 generally has a particle size in the range from about 400 to about 5,000 and preferably from about 500 to about 2,500 microns. In addition, the moisture content of these calcium hypochlorite particles is in the range from about 5 to about 30 percent, and preferably from about 15 to about 27 percent by weight. If desired, the calcium hypochlorite particles separated in discharge line 146 are conveyed to a size classification apparatus such as screens 41 (not shown) wherein the under-sized and over-size fractions are obtained along with the product size fraction. Under-size fraction from the screens is recycled to hopper 141 as seed particles of calcium hypochlorite for the fluidized bed apparatus 130. Over-size fraction is crushed and then recycled to the screens.

The product fraction, which generally has a particle size in the range from about 400 to about 3,000, and preferably from about 600 to about 2,000 microns, may be further dried and coated in a rotary dryer-grainer unit such as the type shown in FIGS. 1 and 3, as rotary dryer 68.

Exhaust gases are conveyed from the top of upper tower 131 through gas discharge line 147 to a suitable dust collection and scrubbing system of the same type as cyclone 52 and a scrubber 54 in FIG. 1 which scrubs the exhaust gases in a suitable liquid to remove the finely divided particles of calcium hypochlorite entrained therein. The resulting slurry is recycled to slurry mixer 14 of FIG. 1.

If desired, compressed air may be fed into spray head 145 through compressed air feed line 148 in order to produce a finely divided spray of calcium hypochlorite slurry as discharge from spray head 145.

More in detail, with respect to the preparation of calcium hypochlorite core particles by the spray graining technique, any pumpable and sprayable calcium hypochlorite slurry containing from about 45 to about 90 percent by weight of water, and preferably from about 50 to about 60 percent by weight of water may be employed. Generally, this slurry is prepared by admixing water with the filter cake of calcium hypochlorite produced in conventional commercial calcium hypochlorite processes of this type described in U.S. Pat. No. 2,195,754–7, described above.

Although water is normally used to make up the slurry, any suitable recycle liquid such as a portion of the filtrate produced in commercial calcium hypochlorite processes, scrubber liquor, or other aqueous medium that are inert to calcium hypochlorite may be employed. If the water concentration of the slurry is below about 45 percent by weight, the resulting slurry is extremely difficult to pump and spray. On the other hand, when the water concentration is above about 90 percent by weight, an extremely large amount of water must be evaporated, and, as a result, feed rate must be reduced, and the production rate is reduced. In addition, there is excessive decomposition of available chlorine when the moist calcium hypochlorite particles are exposed to the heated atmosphere for the extended periods which are necessary to effect evaporation of such large quantities of water.

Other processes for preparing suitable calcium hypochlorite filter cakes are described in *Encyclopedia of Chemical Technology*, Kirk and Othmer, Second Edition, Volume 5, pp 21–24.

More recently, another technique for preparing calcium hypochlorite filter cake and subsequent drying by conventional techniques is described in U.S. patent application Ser. No. 340,121, filed by Walter J. Sakowski, on Mar. 12, 1973, now U.S. Pat. No. 3,895,099, issued July 15, 1975. The filter cake of this process may also be used to prepare the calcium hypochlorite slurry used in the process of this invention. If desired, dry finely divided, pulverized particles of calcium hypochlorite, such as dust recovered in the dry dust collector may be admixed with an appropriate liquid, or dilute solutions or slurries of calcium hypochlorite may be evaporated to form a slurry having a calcium hypochlorite concentration within the above defined ranges and used as a starting slurry in the spray graining technique for preparing core particles.

The proportion of impurities in the calcium hypochlorite slurry will vary with the type of process employed to prepare the calcium hypochlorite filter cake and also with the nature of the lime initially used to prepare the calcium hypochlorite. A typical analysis of a calcium hypochlorite filter cake prepared by a commercial process and a typical preferred analysis range for the calcium hypochlorite slurry useful as a starting material in the preparation of core particles by the spray graining technique are as follows:

| Component | Typical Filter Cake Analysis Percent By Weight | Typical Cake Analysis Range, Percent By Weight |
|---|---|---|
| Calcium hypochlorite | 45.43 | 42–48 |
| Calcium chloride | 0.44 | 0.0–1.5 |
| Calcium chlorate | 0.02 | 0.0–1.5 |
| Calcium hydroxide | 0.24 | 0.2–2.0 |
| Calcium carbonate | 0.44 | 0.1–2.0 |
| Sodium chloride | 7.75 | 6.0–8.0 |
| Water (Difference) | 45.68 | 40–50 |

A suitable rate of feed of the slurry of calcium hypochlorite particles will depend upon a number of factors such as size of the distribution zone, the relative size of the moving bed, the solids concentration of the slurry, the temperature and velocity of the drying gases, the rate of discharge, and the number of spray nozzles positioned in the spray grainer 18 or fluidized bed apparatus 130, as the case may be. Generally, the slurry feed rate for a slurry containing about 55 percent by weight of water ranges from about 100 to about 500 pounds per hour in a spray grainer 18 having a diameter of about 3 feet. In a fluidized bed apparatus of about 3 feet diameter, the feed rate of slurry ranges from about 20 to about 100 pounds per hour.

Faster or slower feed rates may be employed, if desired.

The hold-up time in the distribution zones should be maintained at a minimum since excessive exposure of calcium hypochlorite particles to elevated temperature causes a substantial reduction in the available chlorine concentration. Thus, the total hold-up time in the distribution zone generally ranges from about 30 to about 300 minutes and preferably from about 30 to about 90 minutes. Under conditions of restricted heat input, hold-up time may range up to about 150 to 300 minutes. Hold-up time in rotary dryer 68 or other dryer, when employed, generally ranges from about 5 to about 50 minutes and preferably from about 10 to about 25 minutes. Hold-up time in distributing zone 151, where cooling is effected, may range from about 1 to about 30 minutes, but longer times may be employed, if desired.

The rate of feed or input will have to correspond to the rate of discharge of products in each unit in order to prevent build-up or depletion of the moving bed to an undesirable degree. The number and size of spray nozzles 28, 106, 87, or 145 will depend upon the length of spray grainer 18 or 89, the length of distributing zone 151 in rotary dryer 68, or the cross sectional area of fluidized bed apparatus 130, as the case may be. The spray is utilized in order to obtain maximum dispersion and contact of finely divided droplets of the slurry of calcium hypochlorite or coating composition with the moving particles of calcium hypochlorite in the apparatus being employed. In view of the solids content of the aqueous slurry of calcium hypochlorite, it is necessary to use spray nozzles that are provided with openings of sufficient diameter to prevent clogging of the spray nozzles.

The rate of slurry feed through the spray nozzles 28, 106, and 120 must be in balance with the local heat transfer rate in the drum. Since this declines exponentially as the temperature differential declines, the spray rate through two or more sequential nozzles should also be in the same exponential proportion.

In order to obtain the desired dispersion of the calcium hypochlorite slurry in the distribution zone, air, nitrogen, or other suitable gas which is inert to calcium hypochlorite is compressed and used to disperse the aqueous slurry through the spray nozzle heads. In spray grainer 18 of FIG. 1, it is desired to position spray nozzles 28 in upper portion 20 of the distribution zone 19, as indicated in FIG. 2, in the side opposite from the cascading stream of falling particles. The nozzles should be positioned as close as possible to the falling particles to insure that the slurry contacts the falling particles before the heated gases are capable of evaporating water from the droplets. It is permissable for each spray to be in contact with the cascading stream of falling particles of calcium hypochlorite provided the force of the stream is not strong enough to block the discharge of the spray of calcium hypochlorite slurry from spray nozzles 28. Spray nozzles 106 and 120 are positioned in second spray grainer 89 in the same manner as shown in FIG. 2 for spray nozzle 28.

In order to improve the storage stability of the rounded granular calcium hypochlorite particles produced by the spray graining technique of spray grainer 18 or fluidized bed apparatus 130, or particles produced by conventional calcium hypochlorite processes, these particles are coated with at least one protective coating of a low melting inorganic salt. The protective coating is applied to calcium hypochlorite particles after final drying. The particle size of the calcium hypochlorite particles to be coated generally corresponds to that of the product fraction produced in spray grainer 18 which is discharged through produce conduit 48 from screens 41 in FIG. 1.

Coating of dried calcium hypochlorite in the cooling and graining end of rotary dryer 68, or a separate grainer is effected with low melting hydrated inorganic salts which are molten at temperatures below about 150° C., and which are solid at temperatures below about 40° C. Typical examples of suitable low melting hydrated inorganic salts of this type include hydrates of alkali metal metaborate, alkali metal tetraborate, alkali metal perborate, aluminum sulfate, magnesium sulfate, aluminum nitrate, calcium nitrate, magnesium nitrate, lithium bromide, lithium chlorate, and lithium perchlorate.

Preferred hydrated alkali metal salts include sodium metaborate octa- and tetrahydrate, sodium perborate, sodium tetraborate penta- and decahydrate, eutectic mixtures of sodium tetra- and metaborates with each other, with boric acid, or with sodium hydroxide.

Figure 5:
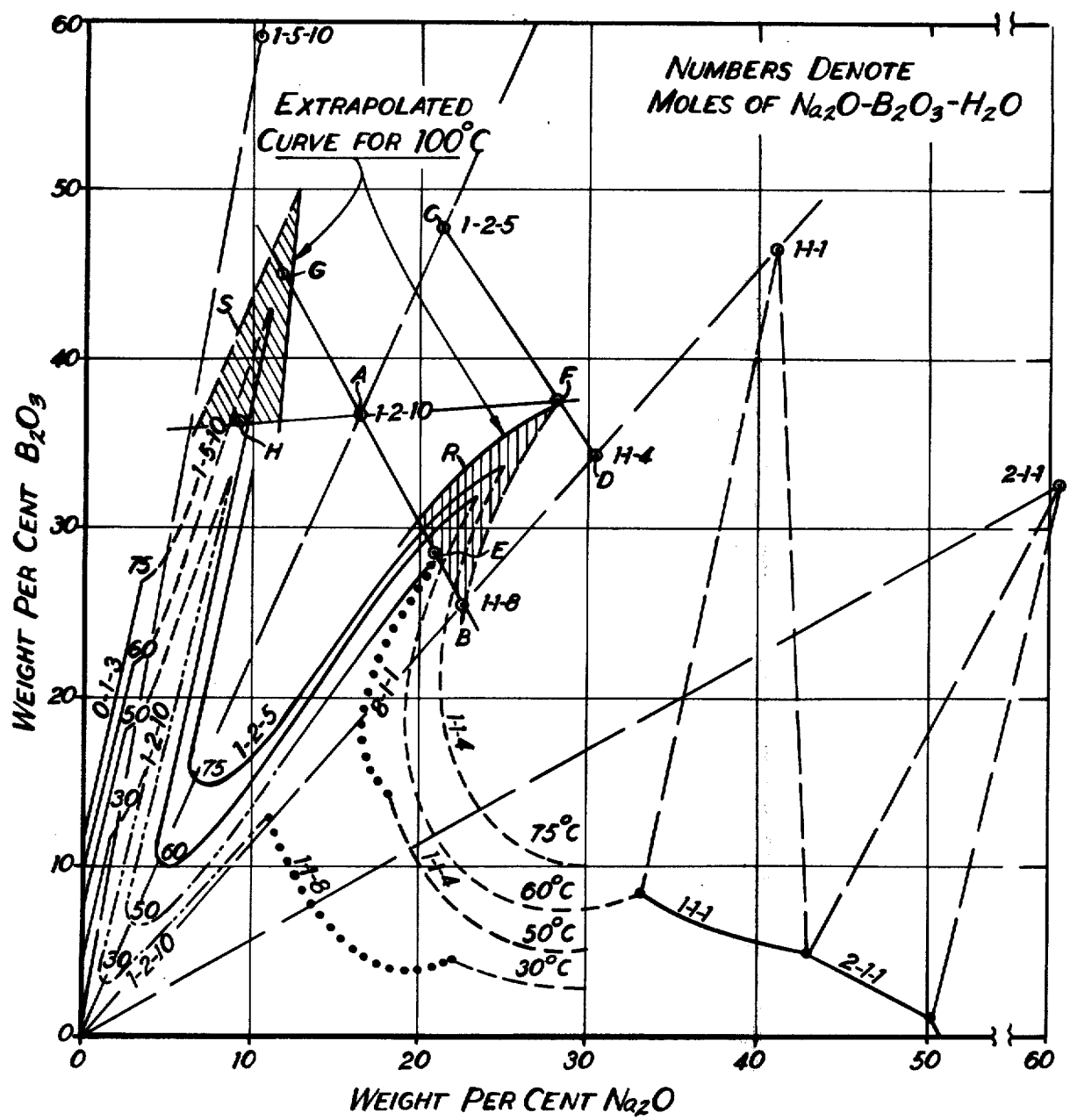
FIG. 5 is a phase diagram for sodium borates.

FIG. 5 is a modification of the phase diagram shown in Gmelin; *Natrium*, p. 1259, FIG. 194 for the system $Na_2O-B_2O_3-H_2O$. The diagram shows the equilibrium compositions of liquids in the lower portion at various temperatures. Solid sodium tetraborate decahydrate is shown at Point A and solid sodium metaborate octahydrate is shown at Point B. When these solids are admixed to form a mixture containing, for example, about 29 percent $B_2O_3$, about 21 percent $Na_2O$ and about 50 percent $H_2O$ (Point E), the eutectic mixture E melts readily at about 53° C., and is easily applied as a coating. Cooling the coating to below 53° C., especially in the presence of finely divided particles of sodium tetraborate decahydrate, or sodium metaborate octahydrate, or recycle fines from rotary dryer 68 effects the formation of a solid coating of a mixture of crystals of sodium tetraborate decahydrate (A), and sodium metaborate octahydrate.

In a similar manner mixtures of the sodium tetraborate pentahydrate C with sodium metaborate tetrahydrate D form a eutectic melt of composition F melting near 100° C. This melt is applied as a spray coating on the calcium hypochlorite. As the melt cools the coating solidifies as a mixture of the hydrated borates. The solidification rate can be accelerated by cooling in the presence of finely divided mixtures of the dry tetra- and metaborates.

By combining hydrated tetra-borates and metaborates in other suitable proportions, eutectic melts between E and F are formed which are also suitable for spray application. As the melt temperature is increased, the usable range of melt compositions is extended by the isotherm. Shading R in FIG. 5 shows the usable melt compositions for the 100° C. isotherm.

Other suitable eutectic mixtures are obtained by mixing hydrates of sodium tetraborate with sodium hydroxide, with or without hydrates of sodium metaborate to obtain a mixture having a concentration falling within the shaded portion R of the diagram. Other suitable eutectic mixtures are obtained by mixing hydrates of sodium metaborate with boric acid with or without hydrated sodium tetraborate to obtain eutectic mixtures falling within the shaded portion R of the diagram. The eutectic mixtures may be premixed and sprayed as a single melt onto the calcium hypochlorite particles. If desired, the components may be sprayed separately as melts onto the calcium hypochlorite particles to form the eutectic mixture which solidifies to form the mixed crystals as described above.

Coating compositions of hydrated tetraborates alone are obtainable by simultaneous spray application of two or more eutectic melts of suitable composition. Thus, eutectic melt F simultaneously applied with eutectic melt H in suitable proportions will solidify as the decahydrate of the tetraborate. The combination of eutectic melt E with G will also solidify as the decahydrate of tetraborate. The same coatings also results from suitable proportions of eutectic melt, from shaded regions R and S. The proportions can also be varied to form coatings intermediate between the deca- and penta-hydrates of the tetraborate.

Aluminum sulfate hydrates which contain from about 12 to about 18 moles of water and magnesium sulfate hydrates which contain from about 4 to 7 moles of water are also preferably employed.

When molten salts of this type are employed, it is only necessary to heat the hydrated salts until they are in molten condition and then spray droplets of the molten composition through spray nozzle 87 onto the dried calcium hypochlorite particles at the lower temperatures in the cooling end of the rotary dryer 68. Solidication of an encapsulating layer of the hydrated salt on the surface of the dried calcium hypochlorite particles is effected with cooling gases, without the need for evaporation of water. Moisture transfer from the hydrated molten salt to the underlying dehydrated calcium hypochlorite is thereby minimized or prevented. The resulting solid layer of the low melting inorganic salt forms a protective coating on the calcium hypochlorite and not only provides stability for the available chlorine content during extended storage and contact with elevated temperature conditions, but also provides improved thermal stability when contacted with burning matches, burning cigarettes, or reactive chemicals such as isopropanol, glycerine, and products containing them.

In order to further improve the stability of the coated calcium hypochlorite particles, particularly when the low melting inorganic salt is acidic, it is preferred to precoat the calcium hypochlorite with an alkaline inorganic salt.

Any alkaline inorganic salt that is non-reactive with the calcium hypochlorite core and which is relatively stable under the handling and storage conditions encountered by calcium hypochlorite may be used as a precoating to encapsulate the calcium hypochlorite core particles.

The alkaline inorganic salt is one which, individually or admixed with a suitable alkaline material forms a coating which has a pH in dilute aqueous solution (for example, about 0.1 molar solution) at ambient temperature of at least about 9 or higher, and preferably from about 9 to about 12.

Typical examples of suitable inorganic salts useful as the precoating include chlorides, chlorates, bromides, bromates, nitrates, carbonates, silicates, phosphates, sulfates, borates, pyrophosphates, tripolyphosphates, hexametaphosphates, and tetraphosphates of an alkali metal such as sodium, potassium, lithium, and mixtures thereof.

It is preferred to employ an alkali metal chloride or bromide admixed with sufficient alkaline material such as an alkalaine earth metal hydroxide to adjust the pH of a dilute aqueous solution of the resulting mixture to the desired level, i.e., a pH of about 9 or higher.

Suitable alkali metal chlorides and bromides include sodium chloride, potassium chloride, lithium chloride, sodium bromide, potassium bromide, lithium bromide, mixtures thereof and the like. Chlorates and bromates of the alkali metals may also be employed.

Suitable alkaine earth metal hydroxides include calcium hydroxide, strontium hydroxide, barium hydroxide, magnesium hydroxide, mixtures thereof and the like. If the calcium hypochlorite core particle contains a large proportion of free lime, it is generally not necessary to mix the inorganic salt with an alkaline earth metal hydroxide.

For example, if the calcium hypochlorite core particle contains about 2 percent by weight of free lime, a coating of sodium chloride comprising up to about 30 percent of the coated particle can be employed. However, it is preferred to mix the alkali metal halide with the alkaline earth metal hydroxide in a weight ratio of from about 2:1 to about 99:1 in an aqueous solution or slurry prior to applying as a coating to the calcium hypochlorite particles.

Although alkali metal hydroxides such as sodium hydroxide and potassium hydroxide have a high pH, they are very corrosive in high concentrations and therefore their use must be carefully controlled when used as the alkaline material.

Alkali metal phosphates and alkali metal borates are sufficiently alkaline to be used as the precoating for the calcium hypochlorite. Suitable compounds of this type include: disodium hydrogen phosphate, dipotassium hydrogen phosphate, sodium tetraborate, potassium tetraborate, and the like. The alkali metal carbonates and alkali metal silicates also are sufficiently alkaline to provide a protective layer, but their use in large proportions may cause the formation of cloudy water due to the precipitation of insoluble calcium salts, which is sometimes objectionable from an appearance standpoint.

The inorganic salt precoating composition is added as a slurry or solution, depending upon the solubility of the inorganic salt in water. Generally, the solution or slurry of coating composition contains from about 40 to about 90 percent water and preferably from about 40 to about 60 percent by water.

Too much water requires excessive exposure of the coated calcium hypochlorite particles to hot gases, which causes loss of available chlorine. Too little water in the coating composition may cause spraying problems due to high viscosity of the slurry.

Calcium hypochlorite decomposes rapidly in the presence of an acid, and therefore it is important for the precoating to be an alkaline substance which forms a dilute aqueous solution having a pH of about 9 or higher. Although this alkaline buffer coating provides stability for the calcium hypochlorite particles against acidic reactions, a higher degree of protection for the calcium hypochlorite core particles against thermal decomposition is obtained by the use of a second coating of a low melting incrganic salt as described above.

Potential chemical interaction between the core and outer inorganic coating salt is diminished by an initial application of an inert buffer layer such as sodium chloride alkalized with calcium hydroxide to the core to provide isolation between the core and the outer coating.

For example, in the preparation of multi-layered particles, calcium hypochlorite core particles of the type produced in spray grainer 18 and recovered as the product fraction from screen 42, or particles otherwise prepared by conventional commercial calcium hypochlorite processes, are precoated with one of the aforesaid alkaline inorganic salts in spray grainer 89 by spraying a slurry or solution of the inorganic salt through spray nozzle 106. After drying the precoated particles to the desired level, a protective coating of a low melting inorganic salt in melt form is then sprayed through spray nozzle 87 onto the calcium hypochlorite core particles precoated with the alkaline inorganic salt.

If desired, a second protective coating of another alkaline inorganic salt may be applied in second spray grainer 89 through spray nozzle 120 as an aqueous solution or slurry. Further evaporation of the aqueous component is required in order to obtain a second thin protective coating on the calcium hypochlorite particles.

After the low melting inorganic salt coating is applied, a coating of a surface conditioning agent may be applied in another spray grainer such as second spray grainer 89. In this embodiment, a solution or slurry of a compound such as a polyacrylic acid or sodium salt thereof is sprayed through spray nozzle 106 to improve flowability or prevent caking of the coated calcium hypochlorite. The water applied to the product in this case should be equal or less than that to be retained in the final product (usually 0.5 percent to about 10 percent) since subsequent drying is not desirable. Where the amount of water is in excess of about 10 percent by weight, the coating solutions or slurries, are applied before final drying, as described above in second spray grainer 89. In addition, coating calcium hypochlorite particles discharged from rotary dryer 68 through product line 86 may be conveyed to an additional dryer such as rotary dryer 68, or a conventional shelf dryer, if it is desired to reduce the moisture content of the resulting coated calcium hypochlorite product.

Generally, the dried coated calcium hypochlorite particles produced by spraying in rotary dryer 68, with or without the application of a buffer coating in second spray grainer 89; have a particle size which ranges from about −4 mesh to about +40 mesh, and preferably from about −10 mesh to about +30 mesh. The thickness of the protective layer of the low melting inorganic salt and any additional alkaline inorganic salts, if present, is generally sufficient to comprise from about 4 to about 45 percent by weight, and preferably from about 4 to about 40 percent by weight of the entire calcium hypochlorite granule. The average available chlorine content of the entire granule generally averages from about 50 to about 80 percent and preferably from about 60 to about 78 percent by weight (dry basis). The average water content of the granules ranges from about 0.5 to about 10, and preferably from about 1 to about 8 percent by weight.

The available chlorine content of the calcium hypochlorite core generally ranges from about 50 to about 85 percent and preferably from about 60 to about 83 percent by weight on a dry basis.

Because of the heterogeneous nature of the exterior layer, the coated calcium hypochlorite particles are more stable to thermal decomposition and loss of available chlorine.

Axial rotation of spray grainers 18 and 89, and rotary dryer 68 is preferably within the range from about 10 rpm to about 45 rpm when the diameter of the drum of spray grainer 18 or 89 ranges from about 1 foot to about 12 feet. These rotation speeds are determined in accordance with the formula:

$$rpm = 20\sqrt{3/D(ft.)},$$

where D = drum diameter

Lower speeds are also practical in accordance with the formula:

$$rpm = 5\sqrt{3/D(ft.)}$$

Other speeds between and beyond these limits are also permissable.

Rotation of spray grainers 18 and 89 and rotary dryer 68 is effected by any convenient motor driven means such as electric motors with chain or gear drives.

Evaporation of the liquid component of the slurry is effected in spray grainers 18 or 89, or fluidized bed apparatus 130 by any suitable heating means such as by means of a heated gas such as air or nitrogen or other gas which is inert to calcium hypochlorite. The gas may be heated indirectly in a heat exchanger, with steam, hot combustion gases, or any other suitable manner. Gases which contain relatively large proportions of carbon dioxide and water vapor are not suitable for drying the liquid components from the slurry in spray grainers 18 or 89 or fluidized bed apparatus 130 since the water component and the carbon dioxide component react with the calcium hypochlorite particles to form undesirable by-products. However, combustion gases or other heating means may be used to externally heat spray grainers 18 or 89 or fluidized bed apparatus 130 in order to maintain a temperature within spray grainers 18 or 89 or fluidized bed apparatus 130 which is sufficiently high to effect the removal and evaporation of liquid from the slurry of calcium hypochlorite without excessive decomposition of the resulting solid calcium hypochlorite granules. Other suitable heating means include external heating of the distribution zone with combustion gases, liquid or solid fuels impinging on the drum walls, electrical heat, direct flame or other direct heating source being applied to the exterior of fluidized bed apparatus 130 or spray grainers 18 or 89.

As indicated in FIGS. 1 and 4, evaporation and removal of the water from the surface of the calcium hypochlorite core particles is effected by passing a stream of heated gas, such as air, nitrogen or other inert gas con-currently through spray grainer 18 or 89, or countercurrently through fluidized bed apparatus 130, as the case may be. If external means are utilized to heat the distribution zone, it is still necessary to maintain a flow of gas through the distribution zone in order to remove the humidified atmosphere that is formed by evaporation and removal of the water from the slurry on the core particles. The temperature of the distribution zone is maintained in the range from about 40° to about 70° C., and preferably from about 45° to about 60° C., by means of the heated gas which is passed through the distribution zone. It is preferred to pass the air concurrent to the flow of the moving bed of solids in spray grainers 18 or 89, but countercurrent flow may also be employed, if desired. The temperature and volume of the gas feed to the distribution zone are correlated with the rate of feed of the slurry, recycle solids, water content and residence time in order to maintain a suitable bed temperature and also effect the desired degree of evaporation of moisture from the calcium hypochlorite particles. In order to maintain the temperature of the distribution zone within the above defined ranges, it is generally necessary to feed heated gas into the feed end of spray grainers 18 or 89, or the frustoconical section of fluidized bed apparatus 130 at a temperature in the range from about 85° C. to about 250° C., and preferably from about 100° to about 200° C. The higher temperatures are suitable with short residence times and higher bed temperatures and the lower temperatures are employed with the longer residence times at lower bed temperatures in order to minimize excessive decomposition of the available chlorine component of the calcium hypochlorite particles due to overheating.

Although such core particles may be precoated with an alkaline inorganic salt, the core particles may be first dried by an convenient technique until the water content is less than about 10 percent by weight before feeding to rotary dryer 68.

As indicated in FIG. 1, it is preferred to screen or otherwise classify the product of spray grainer 18 or fluidized bed 130 to obtain a product fraction of the desired particle size. However, if particle size of the product is not important, sizing of the product of spray grainer 18 can be eliminated. In that case, seed particles of finely divided calcium hypochlorite from another source is fed to spray grainer 18 for coating with calcium hypochlorite. Generally, the product fraction ranges from about 4 to about 40 mesh and preferably from about 10 to about 30 mesh.

In a preferred embodiment of the invention, the product of spray grainer 18 or fluidized bed 130 is screened to obtain a product fraction within the above defined particle size range and then fed to second spray grainer 89 for coating with an alkaline inorganic salt. The coated product of second spray grainer 89 is then further dried to a water content in the range from about 0.5 to about 10 percent and preferably from about 1.0 percent to about 8.0 percent by weight of water. Drying to remove water of hydration is generally effected at a temperature higher than necessary to effect evaporation of free water from the slurry on the particles of calcium hypochlorite in spray grainers 18 and 89, or fluidized bed 130. Generally, the temperature in the heating end of rotary dryer 68, of the type shown in FIGS. 1 and 3, is maintained in the range from about 65° C. to about 100° C., and preferably from about 70° C. to about 80° C. In order to maintain this drying bed temperature, heated air or other suitable gas is fed to the dryer concurrently with the feed at a temperature in the range from about 85° C. to about 200° C. Simultaneously, ambient cooling air having a temperature from about 0° to about 40° C., for example is fed counter-currently at the discharge end of dryer 68 in order to effect solidification of the molten inorganic salt on the surface of the dried calcium hypochlorite particles and to reduce the temperature of the dried coated particles to within a range where decomposition of the available chlorine component of the calcium hypochlorite particles does not occur to a substantial degree. This technique reduces decomposition and also avoids problems of aggregation and sticking of the finished rounded smooth coated calcium hypochlorite product. The coated product can also be conveyed to a separate air-cooled cooling drum, to conveyor coolers with water cooled jackets, to fluidized bed air coolers or the like for further cooling, if desired. Storage of the cooled coated particles is done after cooling the particles to below about 40° C.

Drying of the coated calcium hypochlorite in rotary dryer 68 is generally a dehydration step as well as a drying step. Solid calcium hypochlorite particles in the aqueous slurry fed to spray grainer 18 are primarily in the form of calcium hypochlorite dihydrate which contains about 16.6 percent by weight of hydrated water. Thus, when the product fraction discharged from product conduit 48 contains more than about 16.6 percent water by weight, the water in excess of this amount is free water. When the product from product conduit 48, or the dry product in rotary dryer 68 before coating with the low melting inorganic salt contains less than about 16.6 percent water, the bulk of the water is present as hydrated calcium hypochlorite rather than as free water.

The calcium hypochlorite particles produced by this novel process are ready for packaging, storage, shipping, and use in the purification of water and the like.

In addition to producing coated calcium hypochlorite particles of improved strength and stability, the spray graining technique for preparing the calcium hypochlorite core in one embodiment of this invention also results in improved yield of calcium hypochlorite based upon initial lime and chlorine reactants, since there is a substantial reduction in the amount of available chlorine lost during the processing of the filter cake to produce a dry coated granular product.

Conventional granular calcium hypochlorite particles are in the form of irregular sharp-edged flakes which must be prepared and dried under substantially quiescent conditions with a minimum of agitation because of the sensitivity of the fragile edges to attrition and a high level of dusting. Unlike conventional granular calcium hypochlorite, the rounded granular coated calcium hypochlorite particles of this invention can be subjected to severe conditions of agitation and crushing during granulation and drying without the formation of excessive quantities of dust because sharp, fragile edges are totally absent.

Without being bound by theory, it is believed that the improved structure of the coated calcium hypochlorite particles of this invention are a result of the formation of pliable molten layers of inorganic salt, and calcium hypochlorite solids when the spray graining technique is used to prepared the core particles, which are packed and pounded into the dried hardened underlaying core or seed substrate by innumerable impacts as the particles cascade in the distribution zone or are otherwise forced into violent collision with one another during processing.

As the solids progress through the distribution zones, layer upon layer of calcium hypochlorite is formed in spray grainer 18, and layer upon layer of low melting inorganic salt is formed on the core particles in an onion skin-like manner. If an alkaline inorganic salt is added in spray grainer 89 to the core particles, then layer upon layer of the alkaline inorganic salt is formed in an onion skin-like manner, each layer also imparting strength to the particles.

The novel coated granules of this invention have a high degree of integrity and when subjected to severe pressing force will fracture into integral particles of the granule, rather than decompose into dust, which occurs with conventional granular calcium hypochlorite particles under the same conditions.

The term "rounded" used to characterize the novel coated calcium hypochlorite particles of this invention is intended to cover coated particles which are substantially spherical in shape, but which may exhibit "egg-shaped" distortion also. Irregular particles have a maximum diameter and a minimum diameter. The ratio of the maximum diameter to the minimum diameter of irregular particles of calcium hypochlorite produced by crushing in conventional commercial processes is generally greater than about 2:1. In contrast, the novel coated calcium hypochlorite particles of this invention approach a spherical shape and generally have a ratio of maximum diameter to minimum diameter of about 1.5:1 or less, particularly when the core is prepared by the spray graining technique.

A further difference between the novel rounded coated particles of this invention and the irregular shaped conventional particles is that the outer surface of the rounded particles of this invention is a substantially smooth undisturbed layer of inorganic salt which is formed by depositing the melt of hydrated low melting inorganic salt and cooling to effect solidification thereof. In contrast, the irregular shaped calcium hypochlorite particles of commerce have been formed by compressing wet filter cake between compression rollers to form a sheet-like material, and then fracturing the sheet into irregular shaped platlets which are subsequently dried under quiescent conditions. Because of the unique procedure for preparing the novel coated compositions of this invention, there is a markedly improved resistance to dusting and physical and chemical breakdown.

The following examples are presented to define the invention more clearly without any intention of being limited thereby. All parts and percentages are by weight unless otherwise specified.

EXAMPLE 1

A rotary spray grainer was constructed of a drum 10" in diameter and 12" long turning at 30 to 40 rpm. Access to the interior of the drum was through a 4" opening at one end. Attached to the walls were 4 radial flights 1" high. Drum axis was horizontal. Drum speed was set to produce cascading of the bed over about 50 percent of the cross-sectional area of the drum. Operation of the drum was batchwise.

The starting bed was 1.3 pounds of −20 +30 mesh calcium hypochlorite, a commercial product having the composition shown in Table I, column (1). Heat was supplied by an external gas burner impinging on the drum walls to maintain the bed temperature at about 60° C. (140° F.).

Feed was made up by diluting a calcium hypochlorite filter cake (from Eimco filter) having the composition shown in Table I, column (2). Water was added to make a slurry of creamy, pumpable consistency containing 50 percent water and the analysis shown at Table I, column (3). The slurry was sprayed onto the cascading bed in the heated rotary spray grainer for a period of about 15 hours. A total bed weight of 4 to 5 pounds was required to develop the maximum heat transfer capability of the drum. Particle size control of material in the bed was by periodic screening of the bed. Over-size grain was crushed and returned as required to keep the seeding rate in balance with the production rate. After all the feed was introduced, the bed was heated with air at 90° C. (194° F.) for 10 minutes to dry the calcium hypochlorite particles and the product was removed and analyzed. Total production was 8.9 pounds of product containing 62.5 percent available chlorine and water content of about 5 percent. The production rate was 0.5 lb./hr. Bed retention time was about 300 minutes due to the low rate of heat transfer from the external heater source through the drum walls. The excessive loss of available chlorine is attributed to excessive retention time at too high a bed temperature.

Table I

| Component | (1) Starting Bed | (2) Filter Cake | (3) Slurry Feed |
|---|---|---|---|
| Calcium hypochlorite | 72.0 | 45.43 | 41.50 |
| Calcium chloride | 0.5 | 0.44 | 0.42 |
| Calcium chlorate | 0.1 | 0.02 | 0.02 |
| Calcium hydroxide | 1.5 | 0.24 | 0.23 |
| Calcium carbonate | 1.0 | 0.44 | 0.42 |
| Sodium chloride | 24.0 | 7.75 | 7.41 |
| Water (Difference) | 0.9 | 45.68 | 50.00 |
| | 100.0 | 100.00 | 100.00 |

Composition of Materials in Percent by Weight

EXAMPLE II

In another run in the same equipment as used in Example I, using an initial bed of 3 pounds of commercial −16 mesh calcium hypochlorite, heat was introduced by means of an air stream at a temperature 150° C. (302° F.). The air volume maintained the bed at 45° to 50° C. (113° to 122° F.).

Slurry feed was prepared as before from a filter cake containing 37 percent calcium hypochlorite and 53 percent water. The resulting slurry was sprayed onto the cascading bed in the heated rotary spray grainer for 4 hours. Production rate was 1.3 lb./hr. The available chlorine content of the product was 70.4 percent and the loss of available chlorine in the process was acceptable. The lower loss of available chlorine is attributed to a shorter bed retention time and a lower bed operating temperature.

For purposes of comparison, the spray grainer of Example II was charged with a bed of 4 pounds of commercial −16 mesh calcium hypochlorite containing 69 percent available chlorine. The feed slurry of the same composition as used in Example I was sprayed on the cascading bed in the heated rotary spray grainer for 4 hours. Bed temperature was 70° to 75° C. (158° to 167° F.). Production rate was 2 lb./hr. for 4 hours. The product contained 55 percent available chlorine (dry basis). This batch operation for 4 hours at 70° to 75° C. (158° to 167° F.) resulted in a lower available chlorine product due to excessive retention time at too high a temperature.

EXAMPLE III

In another run in the same equipment as used in Example I, 7 pounds of calcium hypochlorite were grained at 43° C. (109.4° F.) from slurry feed containing 55 percent water, 35 percent calcium hypochlorite and 10 percent of inert salts. Production rate was 1.5 lbs./hr. The starting bed was 4 pounds of commercial granular hypochlorite containing 70 percent available chlorine. The product as grained contained 20 percent of moisture including water of hydration. Five pounds of the hydrated grain was dehydrated in the same drum in 50 minutes by exposure to a 150° C. (302° F.) air stream. Heat input to the drum was electrically heated hot air from an 800 watt source. The weight of anhydrous product recovered was 4 pounds. Calcium hypochlorite content of the product was 72 percent with 2 percent moisture. Loss of product by dusting was negligible. Approximate bed retention time of the starting bed was 120 minutes.

EXAMPLE IV

In another run in the same equipment as used in Example I, 11 pounds of calcium hypochlorite was grained at 50° C. (122° F.) from slurry feed containing 55 percent water, 35 percent calcium hypochlorite and 10 percent inert salts. Production rate was 3.0 lbs./hr. The starting bed was 4 pounds of commercial granular hypochlorite containing 70 percent available chlorine. The product as grained contained 20 percent of moisture including water of hydration. Five pounds of the hydrated grain was dehydrated in the same drum in 35 minutes by exposure to a 200° C. (392° F.) air stream. Heat input to the drum was electrically heated hot air from a 1500 watt source. The weight of anhydrous product recovered was four pounds. Loss of product by dusting was negligible. Calcium hypochlorite content of the product was 72.4 percent with 1.4 percent moisture. Approximate bed retention time of the starting bed was 100 minutes.

EXAMPLES V–VI

Grained and dehydrated products from Examples III and IV were stored for 2 hours at 100° C. (212° F.) equivalent to 1 year at ambient temperatures. The available chlorine loss was 0.27 percent in each instance.

Under humid conditions at 35° C. (95° F.) and 95 percent relative humidity for 16 weeks, the loss of available chlorine content was 6.4 percent, comparing favorably with a 6.22 percent loss for commercial, granular calcium hypochlorite under the same conditions.

EXAMPLE VII

Calcium hypochlorite was grained continuously in a drum 3 feet in diameter and 6 feet long rotated at 18 to 20 rpm provided with 16 radial flights 1" high positioned equidistant from each other around the interior of the drum. Steam heated air at 150° C. (302° F.) was injected at 800 cubic feet per minute. Feed slurry containing 35 percent calcium hypochlorite, 55 percent water and 10 percent inert salts was sprayed onto the cascading bed in the rotating drum at a rate equivalent to 100 lbs./hr. of dry anhydrous product. Moisture in the bed was 15 to 22 percent during graining. The bed was continuously recycled over a screen at a rate of 50 lbs./min. to isolate particles from the bed in excess of 20 mesh screen size. Grained product recovered contained 60 percent calcium hypochlorite and 21 percent water and was recovered at a rate of 127 lbs./hr. The bed retention time was 75 minutes. The hydrated grain was charged at a rate of 500 lb./hr. to a 3-foot diameter drying drum supplied with 800 CFM of air at 177° C. (350° F.). Anhydrous product containing 1 percent of residual moisture and about 70 percent calcium hypochlorite (dry basis) was recovered at a rate of 400 lb./hr. The bed temperature at the dryer discharge end was 74° C. (165° F.). The bed retention time in the dryer was 20 minutes.

EXAMPLE VIII

In a spray grainer of Example VII with a drum diameter of 3 feet and a drum length of 6 feet, the bed charge was 140 pounds of −30 +70 mesh particles commercial calcium hypochlorite. Drum speed was 18 to 22 rpm. Initial drum slope from the feed end was about 0.1 inch/ft. Operation was continuous.

The air stream produced some dusting of the originally charged particles which subsided quickly as the feed spray started and began to hydrate the bed. The air pressure was adjusted to produce uniform droplets of spray.

When the bed weight built up to 160 pounds, the drum slope was increased to 0.2 inch/ft. At this slope, the recycle was adequate to accept the maximum feed rate from the spray head which was equivalent to about 50 pounds of dry granular calcium hypochlorite per hour. A batch of feed from about 320 pounds of wet cake was sprayed onto the warm bed at a rate equivalent to 50 pounds per hour of dry product for about 3 hours. Bed temperature was maintained at 55° to 60° C. (131° to 140° F.) to maintain a water evaporation rate in balance with the slurry feed rate. Available chlorine in the bed and product was 73 to 74 percent (dry basis). With an increased recycle rate, and a 50-pound per hour feed rate the bed temperature declined to 50° C. (122° F.) which resulted in an available chlorine content of the bed and product in excess of 75 percent (dry basis).

EXAMPLE IX

In apparatus as shown in FIG. 1, a diluted slurry of calcium hypochlorite filter cake from an Eimco filter containing 40 percent of calcium hypochlorite, 10 percent sodium chloride and normal impurities and 50 percent water was charged at a temperature of 25° C. (77° F.) to a 10 × 30-foot spray grainer at a rate of 4,000 lb./hr. The interior was fitted with 24 radial flights 6" high positioned equidistant from each other around the interior of the spray grainer. Air was introduced into spray heads on branches in the slurry line at intervals to distribute the feed in the spray grainer. A recycle stream of partially dried calcium hypochlorite pellets amounting to 60,000 lb./hr. (53 percent calcium hypochlorite, 22 percent solid diluents and 25 percent water) was also charged to the spray grainer. The spray grainer and contents were heated to a temperature of 50° C. (122° F.) by a stream of 20,000 cu. ft./min. of steam heated air at 149° C. (300° F.). The spray grainer rotated at 10 rpm. Approximately one half of the recycle stream was screened. A stream of pelletized product of desired size (−16+30) was removed from the screens and charged to the dehydrator (rotary dryer) at the rate of 2670 lbs./hr. Retention time of the bed in the grainer was about 40 minutes. The charged pellets had the same composition as the recycle stream. The dehydrator and contents were heated to 80° C. (176° F.) by hot air in the heating part of the dehydrator by introducing a stream of 7,000 cu. ft./min. at a temperature of 175° C. (347° F.). Retention time in the rotary dryer was 15 minutes. Cooling air at a temperature of 30° C. (86° F.) was drawn into the cooling part (discharge end) of the dehydrator at a rate of about 2,000 cu. ft./min. The combined air streams withdrawn from the spray grainer and from the dehydrator amounting to 29,000 cu. ft./min. were drawn through a dry cyclone dust collector. Dust collected at the rate of 200 lb./hr. was pulverized and recycled to the feed end of the spray graining drum. Residual dust was trapped in a water scrubber. The air was discharged and water containing dissolved calcium hypochlorite was purged from the scrubber and used in making up fresh calcium hypochlorite slurry.

The product was pelletized calcium hypochlorite containing 70 percent available chlorine and having mesh sizes of −16 +30 mesh, U.S. standard screens. It was dust free and dissolved readily in water.

EXAMPLE X

Calcium hypochlorite filter cake produced by the direct paste procedure described in U.S. Patent Application Ser. No. 340,121, filed Mar. 12, 1973, now U.S. Pat. No. 3,895,099, which issued July 15, 1975, containing 83 percent available chlorine (dry basis) was slurried with water to make a paste consisting of 45 percent total solids and 55 percent water. This was dispersed by spraying onto a cascading seed bed in a rotary drum 3 feet in diameter and 6 feet long having 16 radial lifters 1" positioned equidistant from each other on the interior of the drum, turning at 20 rpm. The seed bed was calcium hypochlorite with a size range of −24 +40 mesh. The slurry was sprayed onto the cascading seed bed at the rate of 222 lb./hr. Air heated to 121° C. (250° F.) was admitted to the rotating drum at the rate of 800 standard cubic feet per minute. The bed temperature was maintained at 52° C. (125° F.). Water was evaporated at the rate of 100 lb./hr. to produce spray-grained calcium hypochlorite with 2 moles of water of hydration in the size range −30 +30 mesh at a rate of 122 lb./hr. The available chlorine content of the recovered grain was 81 percent. Retention time of the bed in the drum was 60 minutes.

The recovered grain in the size range −20 +30 mesh was used to form a seed bed of 160 lbs. in the drum described above. Filtrate from the calcium hypochlorite filter, containing 30 percent total solids and 70 percent water, with 35 percent available chlorine in the solids, was sprayed onto the seed bed at a rate of 130 lb./hr. until the bed weight was 200 lbs. The average available chlorine content of the resulting two-layer product was 68 percent.

The 200 pound bed was then exposed to 177° C. (350° F.) air for 15 minutes in the same 3 foot diameter drum to volatize the water of hydration. The bed temperature remained at 74° C. (165° F.) until the residual moisture in the grain was reduced to 1 percent.

EXAMPLE XI

A bed of 200 lbs. of the undried two-layer product prepared as described in Example X was exposed to 177° C. (350° F.) air for 10 minutes in the 3 foot diameter drum to volatilize water of hydration. The bed temperature remained at 74° C. (165° F.). Residual moisture remaining after 10 minutes of dehydration was 6 percent.

EXAMPLE XII

The procedure of Example X was repeated to form a bed of dried two-layer product containing 1 percent of residual moisture. It was cooled from 74° C. to 38° C. (165° F. to 100° F.) by the passage of air at 27° C. (80° F.) for 5 minutes. The cooled anhydrous product was treated by spraying onto the cascading bed in the rotating drum a solution of 1 lb. of a polyacrylic acid sold commercially under the trademark "Calnox" in 5 lbs. of water. Moisture in the final product without further drying was 4 percent and polyacrylic acid content was 0.6 percent.

Other products coated with polyacrylic acid or its alkali metal salts were similarly prepared containing 0.6, 2.2, 2.7, 3.5, 4.9 and 6.1 percent water. Available chlorine contents were 62.1 to 67.8 percent.

EXAMPLE XIII

A fluidized bed was maintained in a cylindrical tower 12 inches in diameter and 24 inches high. At the bottom of the tower, the cross-section was reduced to a 6-inch circular opening by a frustoconical transition section 16 inches high. Heated air at 93° C. (200° F.) was injected at a rate of 60 cubic feet per minute through a diffuser grid located in the 6-inch opening to prevent the flow of solids back into the gas line. Seed was fed into the tower to sustain a level 8 inches from the top of the 12-inch section. Calcium hypochlorite slurry containing 45 percent solids and 55 percent water was sprayed onto the upper surface at a rate of 8 pounds per hour. The upper surface was in active motion by virtue of its support on the fluidized bed of seed contained in the tower. Seed was added at the rate of 1.2 lb./hr. Product was withdrawn at the rate of 4.8 lb./hr. to maintain a fixed upper level in the fluidization tower. The solid in the feed added through the sprays contained 82 percent available chlorine. The calcium hypochlorite product recovered contained 74 percent available chlorine. Grained calcium hypochlorite was withdrawn from the tower at 74° C. (165° F.). It contained 10 percent moisture.

EXAMPLE XIV

The graining drum as described in Example I was loaded with 4 pounds of spray grained calcium hypochlorite with granule sizes ranging from 16— to 24—mesh. The material contained 25 percent moisture and 60 percent available chlorine. A NaCl slurry of pulverized NaCl suspended in saturated NaCl solution was sprayed onto the cascading bed in the drum until the bed weight had increased to 5 pounds. Simultaneously heated air at 200° C. was injected. The bed temperature remained at 45° C. while the slurry was being sprayed. Slurry spray was then discontinued while additional hot air flow was sustained. The bed temperature increased to 73° C. and remained at this temperature level until the bed moisture had declined to 1 percent. Thereafter an increase in the bed temperature occurred. Drying was discontinued when the bed temperature reached 80° C. Bed moisture at this time was 0.7 percent. The recovered bed weighed 3.8 pounds. Weight loss was exclusively due to volatilization of bed moisture. The weight of NaCl used to encapsulate the calcium hypochlorite was 0.8 pounds. Particle size of the grain after coating ranged from −12 to +20 mesh. Available chlorine in the dried product was 63 percent. Encapsulated grain contacted with lighted matches and cigarettes failed to undergo thermal decomposition whereas uncoated grains decomposed completely under similar exposure. The loss rate of available chlorine from the encapsulated material was equivalent to that from unencapsulated material with the same moisture content.

EXAMPLE XV

The graining drum as described in Example I was loaded with 4 pounds of dehydrated spray grained calcium hypochlorite with an available chlorine content of 79 percent and a moisture content of 1 percent. A hot concentrated slurry of basic $Al_2(SO_4)_3$ solution at 110° C. containing 45 percent water was sprayed onto the cool cascading bed in the drum until the weight of the bed had increased to 4.5 pounds. The alum encapsulated calcium hypochlorite contained 70 percent available chlorine and 6 percent water the bulk of which was retained in the outer alum coating. Loss rates of available chlorine during 2 months indicated equivalent storage stability for the dehydrated calcium hypochlorite and the alum encapsulated grain. The alum encapsulated hypochlorite was also completely stable on exposure to lighted cigarettes and chemical contaminants such as glycerine which sufficed to decompose the untreated hypochlorite.

EXAMPLE XVI

Four pounds of dehydrated spray grained calcium hypochlorite was coated with 0.5 pounds of a hot concentrated slurry of alkalized magnesium sulfate as described in Example XV for the alum coating. After cooling the hot alkalized magnesium sulfate slurry froze onto the hypochlorite as the crystalline hydrate of the salt. Available chlorine after coating was also 70 percent with 6 percent water. The 2-month storage stability was equivalent to that of the uncoated anhydrous calcium hypochlorite and the encapsulated product was also insensitive to decomposition by exposure to localized heat or chemical contaminants.

EXAMPLE XVII

The graining drum of Example VII which was 3 feet in diameter and 6 feet long turning at 20 RPM was loaded with 160 pounds of spray grained calcium hypochlorite containing 79 percent available chlorine and 1 percent water. This bed was coated simultaneously from two feed sprays making applications in approximately equal amounts of an acidic eutectic of molten borates containing 12 percent $Na_2O$; 45 percent $B_2O_5$; and 43 percent water, and an alkaline eutectic of molten borates containing 26 percent $Na_2O$; 35 percent $B_2O_3$; and 39 percent water. Neutralization of these two molten eutectics on the surface on the dehydrated and cool hypochlorite resulted in crystallization of the neutral, hydrated sodium tetraborate. Total coating weight applied was 20 pounds. The hypochlorite encapsulated in the hydrated borate was insensitive to decomposition by standard tests for thermal initiation or chemical contamination. This material exhibited storage stability equivalent to that of the dehydrated calcium hypochlorite.

EXAMPLE XVIII

The coating demonstration as described in Example XVII was repeated using an eutectic melt of sodium borate containing 22 percent Na$_2$O; 30 percent B$_2$O$_3$; and 48 percent water in one spray and a 50 percent solution of NaOH in a second spray. Both sprays were directed into the same position of the cascade and were operated simultaneously to form a hydrated metaborate crystal shell on the surface of the hypochlorite containing 25 percent Na$_2$O; 28 percent B$_2$O$_3$; and 47 percent water. Total coating applied to the 160 pound bed was 15 pounds. The encapsulated product contained 72 percent of available chlorine and 5 percent of water. The encapsulated product was insensitive to decomposition by standard tests for thermal initiation or chemical contamination and also exhibited long term storage stability equivalent to the uncoated dehydrated calcium hypochlorite.

EXAMPLE XIX

Four pounds of rounded spray grained calcium hypochlorite containing 25 percent moisture prepared as in Example VII in the spray grainer was dehydrated in the equipment described in Example I by contact with heated air at 180° C. for 15 minutes. The dehydration temperature remained at 73° C. until the bed moisture was 1 percent. The recovered product weighed 3.0 pounds which includes 0.03 pounds of moisture. Dust loss during drying was only 1 percent of the weight of the product recovered.

For purposes of comparison, the drying test of this example was repeated with 4 pounds of irregular sharp-edged flaky grain taken from the conventional calcium hypochlorite manufacturing operations. Dehydration was continued to 1 percent moisture. The recovered product was only 2.5 pounds. Dust loss during drying was 20 percent of the weight of the recovered product.

This comparison shows the high degree of integrity and resistance to dusting that is inherent in the novel rounded calcium hypochlorite particles of the invention which are not characteristic of prior art calcium hypochlorite product.

EXAMPLES XX-XXIII

Calcium hypochlorite was grained continuously, as in Example VII, in a drum 3 feet in diameter and 6 feet long turning at 20 rpm. The interior of the drum was fitted with 16 radial flights 1 inch high positioned at equal intervals around the inner circumference. Steam heated air at 150° C. (302° F.) was injected at 800 cubic feet per minute. Feed slurry containing 36 percent calcium hypochlorite, 9 percent inert salts and 55 percent water was sprayed onto the cascading bed at a rate equivalent to the production of 100 lbs./hr. of dry granular solids. Moisture in the bed was 20 percent. The recovered grain contained 79 percent of available chlorine based on dry solids. Product removed from the recycled bed was in the range from about minus 14-mesh to plus 24-mesh. Operation was continued until the accumulated production was about 165 pounds, which was designated as Portion A. Three five pound portions were separated from Portion A and designated as Portions B, C and D, respectively.

The balance of Portion A was reloaded as bed in the above defined graining drum and coated with a slurry of pulverized sodium chloride suspended in a solution of containing about 20% NaCl, about 10% Ca(OCl)$_2$ and about 70% H$_2$O. Air flow and temperature were the same as the initial graining run. The bed was recycled externally from the discharge end of the drum to the feed end. Bed moisture during the application of the second coating was maintained at about 21%.

On completion of the application of the second coating of sodium chloride, the spray feed to the drum was stopped while heated air flow continued to dry and dehydrate the material in the drum. The coating contained about 11.5 NaCl and about 5.5% Ca(OCl)$_2$. The product contained about 66.0% Ca(OCl)$_2$ and about 4.5% H$_2$O. Sufficient moisture was, however, retained at the termination of the drying period to stabilize the product against decomposition from thermal sources of ignition.

The thus coated sample was identified as Portion E and two five pound portions, designated as Portions F and G, respectively, were separated therefrom.

Portions B, C, F and G were separately coated with additional layers of hydrated aluminum and magnesium sulfate in molten form. The application was made batchwise in a smaller drum 12-inches in diameter and 12 inches long fitted with 16 radial flights 1 inch high uniformly spaced around the interior of the drum. Drum rotation was 35 rpm. Heated air was injected from an electrically heated blast gun rated for 1500 watts. At the termination of the coating operation, the flow of heated air was continued until the residual moisture was still sufficient to secure the product against decomposition by thermal initiation. The molten layers were solidified by cooling the coated particles with cool air provided by a blower.

For purposes of comparison, the analysis of the uncoated sample, Portion A, is presented as Comparative Example A in Table I. Product analyses for each coated product is also set forth below in Table 1.

Table I

| | | Particles Coated with Hydrated Salt | | | |
| | | Final Coating Composition | | | Product |
| Example | Portion | Al$_2$(SO$_4$)$_3$ | MgSO$_4$ | H$_2$O | Ca(OCl)$_2$ |
|---|---|---|---|---|---|
| Comparative Example I | A | 0.0 | 0.0 | 6.0 | 72.0 |
| XX | B | 6.3 | 0.0 | 5.9 | 65.7 |
| XXI | C | 0.0 | 6.3 | 6.2 | 65.6 |
| XXII | F | 3.2 | 0.0 | 3.8 | 64.2 |
| XXIII | G | 0.0 | 3.2 | 3.7 | 64.8 |

Note: Water concentration in product required to desensitize product against initiation of decomposition from thermal sources of ignition.

EXAMPLES XXIV - XXVIII

Molten coatings of hydrated borates were applied by spray application in a drum 10 inches in diameter and 12 inches long turning at 35 rpm. Cool air was injected into the drum to remove the heat of solidification of the coating. The coating mixture contained 22 percent Na$_2$O, 30 percent B$_2$O$_3$, and 48 percent H$_2$O. This is a low melting eutectic mixture of hydrated tetra- and meta-borates. The melting point of the mixture was 60° C. Application of the coating was continued until samples of the coated product were insensitive to decomposition initiated thermally by contact with lighted cigarettes and matches or by sensitizing contaminants such as glycerine.

The materials coated consisted of conventional granular calcium hypochlorite and spray grained calcium hypochlorite. In one instance the spray grained core was first coated with 5 percent of a buffer layer of NaCl combined with Ca(OH)$_2$ in the ratio 10 NaCl/1 Ca(OH)$_2$. The materials had been dehydrated to about 1.5 percent moisture prior to the coating application. After coating the coated products were stored side by side with uncoated core stock. In all cases, the loss rates for the coated and uncoated materials was practically identical. Nevertheless, the uncoated material was highly reactive and subject to self-propagating exothermic decomposition whereas the coated material was stable and non-reactive.

Table II

| | | | Samples Stored at 73° F. and 50% Relative Humidity | | | | | |
|---|---|---|---|---|---|---|---|---|
| Example | Core | Coating | $H_2O$ % | Initial $Ca(OCl)_2$ % | Final $Ca(OCl)_2$ % | Loss of $Ca(OCl)_2$ % | Storage Time Days | $Ca(OCl)_2$ Loss %/Day | Reactivity of $Ca(OCl)_2$ |
| | Conventional | None | 1.4 | 74.4 | 71.4 | 3.0 | 180 | 0.017 | Yes |
| XXIV | Granular | Borate | 6.8 | 62.6 | 59.6 | 3.0 | 180 | 0.017 | No |
| | Spray | None | 1.4 | 75.9 | 74.6 | 1.3 | 180 | 0.007 | Yes |
| XXV | Grained | Borate | 5.5 | 64.4 | 63.4 | 1.0 | 180 | 0.006 | No |
| | Spray | None | 1.7 | 71.7 | 69.8 | 1.9 | 180 | 0.010 | Yes |
| XXVI | Grained | NaCl + $Ca(OH)_2$ + Borate | 4.9 | 66.5 | 64.8 | 0.7 | 180 | 0.004 | No |
| | Spray | None | 1.3 | 75.5 | 74.4 | 1.1 | 180 | 0.006 | Yes |
| XXVII | Grained | Borate | 4.5 | 67.6 | 66.3 | 1.3 | 180 | 0.007 | No |
| | Conventional | None | 1.5 | 74.3 | 72.7 | 1.6 | 180 | 0.009 | Yes |
| XXVIII | Granular | Borate | 6.9 | 66.4 | 64.5 | 1.9 | 180 | 0.010 | No |

Note:
"Yes" signifies that the hypochlorite decomposes exothermally when initiated thermally or by contamination
"No" signifies that the hypochlorite is insensitive to thermal or chemical initiators What is to be secured by Letters Patent is:

1. Coated rounded granular calcium hypochlorite particles comprised of a core of calcium hypochlorite encapsulated with a plurality of layers of a low melting inorganic salt wherein said low melting inorganic salt is selected from the group consisting of hydrated alkali metal metaborate, hydrated alkali metal tetraborate, hydrated aluminum sulfate, hydrated magnesium sulfate, eutectic mixtures of alkali metal metaborate and hydrated alkali metal tetraborate, and mixtures thereof, and said inorganic salt having a melting point in the range from about 40° to about 150° C., wherein said core is prepared by spray graining of a calcium hypochlorite slurry in a distribution zone and said encapsulation is formed by spraying said particles with a melt of said inorganic salt and wherein said core ranges in diameter from about 200 to about 2000 microns and the outside diameter of said particles ranges from about 400 to about 5000 microns.

2. Coated granular calcium hypochlorite particles of claim 1 comprised of a core of calcium hypochlorite encapsulated with at least one individual layer of an inorganic salt other than calcium hypochlorite, said inorganic salt being admixed with sufficient alkaline material to form a coating which has a pH in dilute aqueous solution at ambient temperature of at least about 9 or higher, said inorganic salt being encapsulated with at least one layer of a low melting inorganic salt having a melting point in the range from about 40° C. to about 150° C.

3. The calcium hypochlorite particles of claim 1 wherein said low melting inorganic salt is hydrated alkali metal tetraborate.

4. The calcium hypochlorite particles of claim 3 wherein said hydrated alkali metal tetraborate is sodium tetraborate decahydrate.

5. The calcium hypochlorite particles of claim 1 wherein said low melting inorganic salt is sodium metaborate octahydrate.

6. The calcium hypochlorite particles of claim 1 wherein said low melting inorganic salt is hydrated aluminum sulfate containing from about 12 to about 18 moles of water.

7. The calcium hypochlorite particles of claim 1 wherein said low melting inorganic salt is hydrated magnesium sulfate containing from about 4 to about 7 moles of water.

8. The calcium hypochlorite particles of claim 2 wherein said inorganic salt is an alkali metal salt selected from the group consisting of chloride, chlorate, nitrate, bromide, carbonate, silicate, phosphate, sulfate pyrophosphate, tripolyphosphate, hexametaphosphate, and tetraphosphate of an alkali metal.

9. The calcium hypochlorite particles of claim 8 wherein said alkaline material is selected from the group consisting of calcium hydroxide, strontium hydroxide, barium hydroxide, magnesium hydroxide, and mixtures thereof.

10. The calcium hypochlorite particles of claim 9 wherein said alkali metal salt is selected from the group consisting of sodium chloride, potassium chloride, lithium chloride, sodium bromide, potassium bromide, lithium bromide, and mixtures thereof.

11. The calcium hypochlorite particles of claim 10 wherein said alkali metal salt is sodium chloride, said alkaline material is calcium hydroxide, and said low melting inorganic salt is sodium tetraborate decahydrate.

12. The calcium hypochlorite particles of claim 10 wherein the average available chlorine content of said particles ranges from about 50 to about 80 percent by weight on a dry basis.

13. The calcium hypochlorite particles of claim 12 wherein the average water content ranges from about 0.5 to about 10 percent by weight.

14. The calcium hypochlorite particles of claim 13 wherein the particle size of said calcium hypochlorite particles ranges from about 600 to about 2,000 microns.

15. The calcium hypochlorite particles of claim 14 wherein the average available chlorine content of said particles ranges from about 60 to about 78 percent by weight and the water content of said particles ranges from about 1 to about 8 percent by weight.

16. The calcium hypochlorite particles of claim 15 wherein the proportion of said inorganic salt coating on said particles ranges from about 4 to about 45 percent by weight of said particles.

17. The calcium hypochlorite particles of claim 16 wherein said low melting inorganic salt is a hydrated aluminum sulfate containing from about 12 to about 18 moles of water of hydration.

18. The calcium hypochlorite particles of claim 16 wherein said low melting inorganic salt is a hydrate of magnesium sulfate containing from about 4 to about 7 moles of water of hydration.

19. The calcium hypochlorite particles of claim 16 wherein said low melting inorganic salt is a hydrated borate of sodium.

20. The calcium hypochlorite particles of claim 3 wherein said coated particles are encapsulated in at least one layer of a polyacrylic acid.

* * * * *